(12) United States Patent
Dhayalan et al.

(10) Patent No.: US 7,895,240 B2
(45) Date of Patent: Feb. 22, 2011

(54) SYSTEMS AND METHODS FOR MANAGING INFORMATION

(75) Inventors: Anbumani Dhayalan, New Haven, CT (US); Cary Michael Correia, Sandy Hook, CT (US); Jeremy Miles Filiatrault, Glenville, NY (US); Sukhminder Singh Grewal, New Haven, CT (US); Neetu Agarwal, Patiala (IN)

(73) Assignee: General Electric Company, Schenectady, NY (US)

( * ) Notice: Subject to any disclaimer, the term of this patent is extended or adjusted under 35 U.S.C. 154(b) by 568 days.

(21) Appl. No.: 11/050,129

(22) Filed: Feb. 3, 2005

(65) Prior Publication Data

US 2006/0173900 A1    Aug. 3, 2006

(51) Int. Cl.
*G06F 7/00* (2006.01)
(52) U.S. Cl. .................. 707/802; 705/8; 705/9
(58) Field of Classification Search ........... 705/8, 705/9; 707/102, 802, 999.102
See application file for complete search history.

(56) References Cited

U.S. PATENT DOCUMENTS

| | | | | |
|---|---|---|---|---|
| 5,481,667 A | * | 1/1996 | Bieniek et al. | 715/709 |
| 5,890,149 A | * | 3/1999 | Schmonsees | 707/3 |
| 5,893,098 A | * | 4/1999 | Peters et al. | 707/10 |
| 6,539,271 B2 | | 3/2003 | Lech et al. | 700/108 |
| 6,551,107 B1 | * | 4/2003 | Buckley et al. | 434/262 |
| 6,587,754 B2 | | 7/2003 | Hung et al. | 700/286 |
| 6,678,716 B1 | * | 1/2004 | Pronsati et al. | 709/201 |
| 6,772,157 B2 | | 8/2004 | Barnett et al. | 707/9 |
| 6,859,784 B1 | * | 2/2005 | van Duyne et al. | 705/10 |
| 6,915,287 B1 | * | 7/2005 | Felsted et al. | 707/1 |
| 7,012,421 B2 | | 3/2006 | Lavoie et al. | 324/142 |
| 7,013,203 B2 | | 3/2006 | Moore et al. | 700/286 |
| 7,035,838 B2 | | 4/2006 | Nelson et al. | 707/1 |
| 7,076,439 B1 | * | 7/2006 | Jaggi | 705/9 |
| 7,082,403 B2 | | 7/2006 | Wagner et al. | 705/8 |
| 7,092,975 B2 | | 8/2006 | Bradley et al. | 707/204 |
| 7,107,268 B1 | * | 9/2006 | Zawadzki et al. | 707/9 |
| 7,107,285 B2 | * | 9/2006 | von Kaenel et al. | 1/1 |

(Continued)

*Primary Examiner*—Charles Rones
*Assistant Examiner*—Phuong-Thao Cao
(74) *Attorney, Agent, or Firm*—Armstrong Teasdale LLP

(57) ABSTRACT

A method for managing information is described. The method includes generating a first database in a first memory device, storing, by an administrator via a server system, a plurality of questions in the first database, where the plurality of questions relate to project information, and storing, by the administrator, a plurality of answers and a plurality of options related to the project information, where each answer corresponds to one of the plurality of questions and one of the options. The method further includes associating, by the administrator, the plurality of answers with a task by predefining, within the first database, the task to be performed based on the plurality of answers. The method also includes associating, by the administrator, a plurality of tools used to complete the task with the task, where the plurality of tools include at least one of templates used to manage the task, experts on the task, and frequently asked questions regarding the task. The method includes providing, via a computer, to a user, the plurality of questions and the plurality of options, receiving the plurality of answers from the second user, determining, by the computer, the task and the tools, where determining is based on the plurality of answers provided by the user, and creating at least one additional database in a second memory device.

16 Claims, 38 Drawing Sheets

U.S. PATENT DOCUMENTS

| | | | |
|---|---|---|---|
| 7,321,886 B2 * | 1/2008 | Swaminathan et al. | 706/60 |
| 2001/0005849 A1 * | 6/2001 | Boothby et al. | 707/1 |
| 2001/0034639 A1 * | 10/2001 | Jacoby et al. | 705/10 |
| 2003/0018510 A1 * | 1/2003 | Sanches | 705/9 |
| 2003/0114224 A1 * | 6/2003 | Anttila et al. | 463/40 |
| 2003/0210264 A1 * | 11/2003 | Macrossan | 345/751 |
| 2004/0003353 A1 * | 1/2004 | Rivera et al. | 715/530 |
| 2004/0007121 A1 * | 1/2004 | Graves et al. | 89/1.11 |
| 2004/0024656 A1 * | 2/2004 | Coleman | 705/27 |
| 2004/0039578 A1 * | 2/2004 | Sirois | 705/1 |
| 2004/0049418 A1 * | 3/2004 | Watanabe et al. | 705/12 |
| 2004/0054693 A1 * | 3/2004 | Bhatnagar | 707/104.1 |
| 2004/0078098 A1 * | 4/2004 | Jeffries | 700/52 |
| 2004/0111387 A1 * | 6/2004 | Nelson et al. | 707/1 |
| 2004/0205040 A1 * | 10/2004 | Yoshioka et al. | 706/50 |
| 2004/0260569 A1 * | 12/2004 | Bell et al. | 705/1 |
| 2005/0010465 A1 * | 1/2005 | Drew et al. | 705/9 |
| 2005/0010544 A1 * | 1/2005 | Sleat | 706/46 |
| 2005/0027386 A1 * | 2/2005 | Weigand et al. | 700/97 |
| 2005/0028158 A1 * | 2/2005 | Ferguson et al. | 718/100 |
| 2005/0033615 A1 * | 2/2005 | Nguyen et al. | 705/5 |
| 2005/0065865 A1 * | 3/2005 | Salomon et al. | 705/35 |
| 2005/0086096 A1 * | 4/2005 | Bryant | 705/10 |
| 2005/0086220 A1 * | 4/2005 | Coker et al. | 707/4 |
| 2005/0197999 A1 * | 9/2005 | Kumar | 707/1 |
| 2005/0209903 A1 * | 9/2005 | Hunter et al. | 705/9 |
| 2005/0278207 A1 * | 12/2005 | Ronnewinkel | 705/8 |
| 2006/0004621 A1 * | 1/2006 | Malek et al. | 705/10 |
| 2006/0020501 A1 * | 1/2006 | Leicht et al. | 705/8 |
| 2006/0026500 A1 * | 2/2006 | Qa'Im-maqami | 715/506 |
| 2006/0036563 A1 * | 2/2006 | Wu | 706/59 |
| 2006/0040248 A1 * | 2/2006 | Aaron | 434/362 |
| 2006/0069604 A1 * | 3/2006 | Leukart et al. | 705/9 |
| 2006/0106774 A1 * | 5/2006 | Cohen et al. | 707/3 |
| 2006/0111953 A1 * | 5/2006 | Setya | 705/8 |
| 2006/0149604 A1 * | 7/2006 | Miller | 705/4 |
| 2006/0161392 A1 * | 7/2006 | Sholl et al. | 702/183 |
| 2006/0167731 A1 * | 7/2006 | Nishimura et al. | 705/8 |

* cited by examiner

① User answers questions about their project...

Project Questions

Q1. What is your best guess at what this project might cost to implement (in USD)?
- <10k
- 11-25k
- 26-50k Q2. Is your project an ERP project?
- No
- Yes - Full ERP Implementation
- Not Sure

Personal Items

Jeremy Filiatrault
Facilitator

Mac Parisay
Co-Facilitator

Common problems >
- WELL WRITTEN BUS REQ
- FAQS
- EXPERT CASES

Welcome to SupportCen

My Projects

Project Plan Definitions          Project Plan Instructions

Project Id:        Project Name:

| 1660 | Bus Proj Ldr ▼ | ☑ | Build Project Team | Y |  | ? |  | 12/03/2001 | 12/03/2001 | 12/03/200 |
|------|----------------|---|--------------------|---|--------|---|-----|------------|------------|-----------|
| 1661 | Bus Proj Ldr ▼ | ☑ | Modify Online Project Plan | Y | 91660 | ? | 1 | 12/04/2001 | 12/04/2001 | 12/04/200 |
| 1663 | Bus Proj Ldr ▼ | ☑ | Complete Project Charter | Y | 91661 | ? | 1 | 12/05/2001 | 12/07/2001 | 12/05/200 |
|      |                | ☑ | Write/Update Business Reqmnts Document | Y | 91663 | ? | 120 | 12/10/2001 | 05/24/2002 | 12/10/200 |
|      |                | ☑ | Review: Bus Reqmnts Doc | Y | 91666 | ? | 21 | 05/27/2002 | 06/24/2002 | 05/27/200 |

Create the DPMM Databases

Creates the Database for Storing Potential Process Data Customizations By a Team or Organization

| Create a New Community | |
|---|---|
| Community Name: | |
| Community Description: | |
| Community Keyword: | RealEstateDPMM |
| Facilitator: | |
| Co-Facilitator: | Patel, Anass |
| Select the Function and Category in which the Community will be listed | |
| For Business: | GE Commercial Finance ▽ |
| For Sub-Business: | GE CMF Real Estate ▽ |
| Community Language: | English ▽ |
| Expert Information | |
| Expert Registration Preference: | All Users ▽ |
| Select Experts for the Community: | Filiatrault, Jeremy<br>Patel, Anass<br>Krishnan, Magesh |

① Go to the Support Central Home Page and click the "Form a New Community" button: Support Central Home Page ③ Enter the names of the 2 people you want to have Administrative Rights to edit/manage the process data ⑩ You need at least 3 Experts to get the community approved. The Facilitators will count as 2 experts automatically. To expedite the creation of DPMM, add a person(s) that you can easily contact and ask to approve the community. You can always replace them later as an expert Continued on Next Slide

FIG. 7

Populate the Databases

Migrate Process Data into Master Database

1- Open the template you completed of the "DPMM Pre work" exercise.
2- Massage the data into this template. The instructions and examples are in the template itself.

Microsoft Excel
Worksheet

3- Go to the Super Community you created in Step 2 of the "Create the DPMM Databases" task (Slide 7&8) and follow these steps:

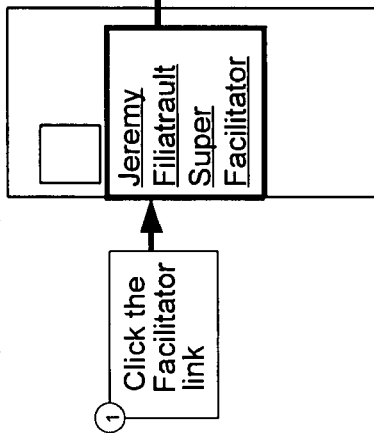

FIG. 12

Populate the Databases

Entering the Remaining Process Data into the Master Process Database
You entered the process step names and descriptions. You enter the remaining Data using the DPMM Master Administrative Screen.

Verify Categorized as a "Meeting"

Projects

My Projects | Jeremy | Projects

Edit Task Properties

- Task List
- Task Name
- Task Description
- Task Instructions
- Note to Owner
- Critical Path: Yes and Opti...
- Task Category: Meeting
- Contributors: Select One
- Choose a Community: NPI Customizations Database
- Sign Offs: Select One
- Task Owner: Bus Proj Ldr Save Changes ① Confirm that Task Category= "Meeting" in the Edit Task screen of the Master Process Admin ② Go to the "Choose a Community" site

FIG. 24

Create Review Request Form

Add these fields to the form. Use the same exact words listed in the "Help Text" so that the mapping of data to the Reporting Cockpit is correct.

⑧ Recommended Section Header: Contact Information
Attributes for Section Header:
[ Contact Information ]

⑨ Field #1: Document Author
Attributes for People Section:
Name:* [ Document Another ]
Mandatry Field?: ●Yes ○No ⑩ Field #2: Author's Company
Attributes for Dropdown:
Name:*
Mandatry Field?: ●Yes ○No
Values (seperated by ";"):*

⑪ Recommended Field: "Other Company"
Select form elements, and fill out the related attributes below:
Attributes for Text Box: [ TextBox ▽ ]
Name:* [ If "Other" company, ]

⑫ Section Header: Application Information
Select form elements, and fill out the related attributes below: [ ▽ ]
Attributes for Section Header:

The following spreadsheet shows common fields and values for code reviews and document reviews. Feel free to copy and paste data or use for ideas for your form.

Microsoft Excel Worksheet

⑬ Field #3: Application or Project Name
Select form elements, and fill out the related attributes below: [ TextBox ▽ ]
Attributes for Text Box:
Name:* [ Application o ]
Mandatry Field?: ●Yes ○No ⑭ Field #4: Application Major Version #
Select form elements, and fill out the related attributes below: [ Dropdown ▽ ]
Attributes for Dropdown:
Name:* [ Application Major V ]
Mandatry Field?: ●Yes ○No ⑮ Field #5: Application Minor Version #
Attributes for Dropdown:
Name:* [ Application Minor V ]

⑯ Add any other fields you want. If this is a document review than you should probably add a field to capture the document.

FIG. 30

The Solution: IM Quality Cockpit

*The third step is to provide a robust cockpit that can slice and dice ALL data entered in the workflow, provide aggregate reporting, and drill-down capability to a single defect on a single review.*

Vendor Performance

Show Data for: ●Vendor ○Team ○Business

Entire Application LifeCycle

| Vendor | Rank | Work Quality | | | | COQ (Rework) | | | | | |
|---|---|---|---|---|---|---|---|---|---|---|---|
| | | TOT Work Time (Hrs) | Passed First Reviews | Failed First Reviews | First Time Right % | Cycle Time Rework (Bus Days) | | | Labor Time Rework (Hrs) | | |
| | | | | | | Project Team | Review Team | TOT Bus Days | Project Team | Review Team | TOT Labor Hrs |
| Oracle Corporation | 1 | 2 | 1 | 0 | 100% | 0 | 0 | 0 | 0 | 0 | 0 |
| Birlasoft | 3 | | | | 90% | 8 | 3 | | | | 74 |

Business Performance

Show Data for: ○Vendor ○Team ●Business

| Vendor | Entire Application LifeCycle | | | | | |
|---|---|---|---|---|---|---|
| | Work Quality | | | COQ (Rework) | | |
| Energy Shared Services | | | | | | |
| Energy Products | | | | | | |

IT Team Performance

Show Data for: ○Vendor ●Team ○Business

| Team | Entire Application LifeCycle | | | | | |
|---|---|---|---|---|---|---|
| | Work Quality | | | COQ (Rework) | | |
| GEE Arch Team | | | | | | |
| GEE QC Team | | | | | | |

FIG. 32

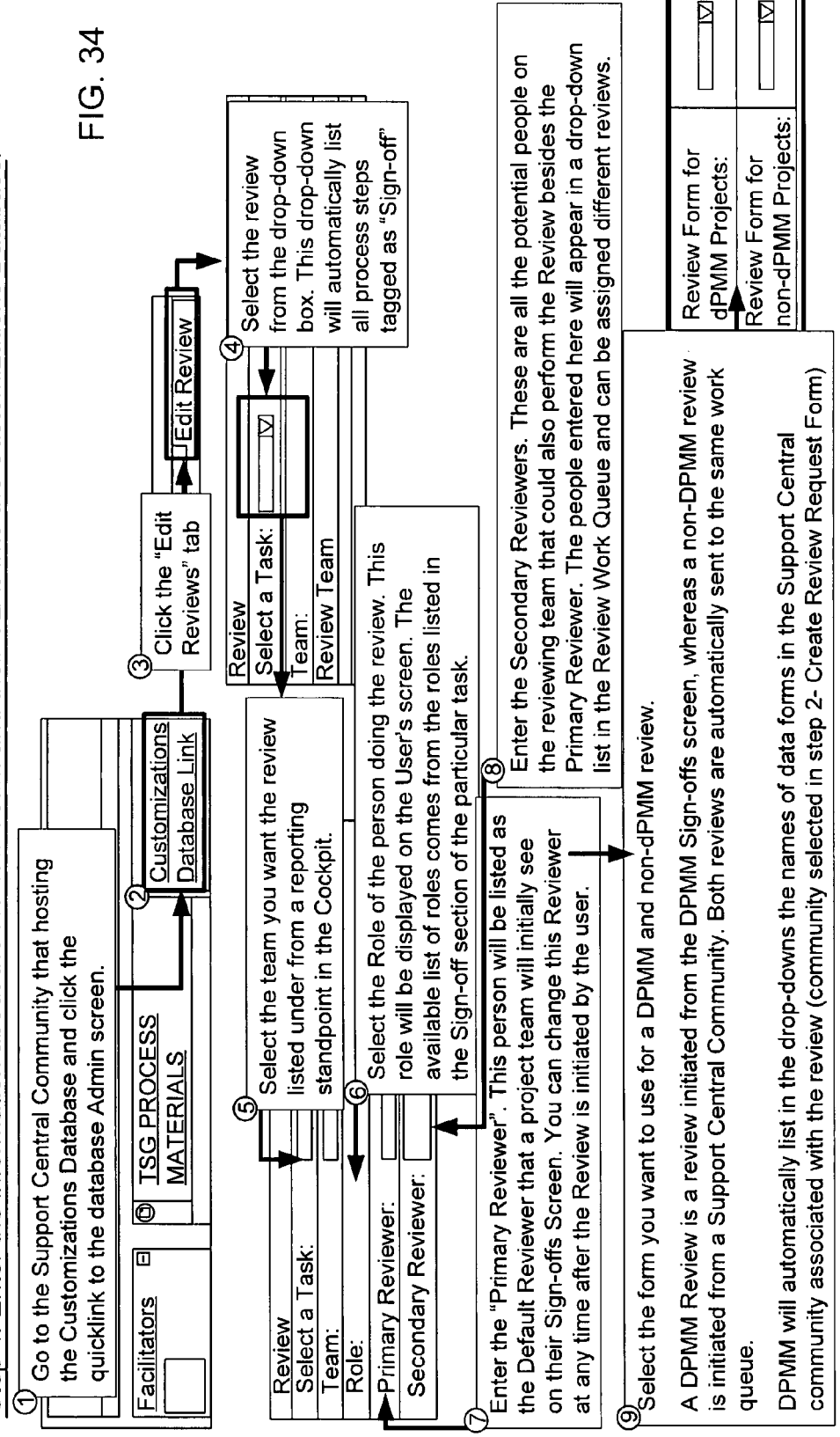

Enter Reviewer Information

(10) DPMM will give standard metrics like First Time Right and COQ. If a review team would like to collect additional metrics they can create another data form on the same community as the Request Data Form. In the new data form, the review team can add the metrics fields to the form and when they select the form in the "Additional Info Data Form" drop-down, it will appear in the Work Queue on the Review Summary screen.

(11) Disregard for sign-off reviews. Will use this only for reviews of type= "Peer" and "TG"

(12) Select whether you want the metrics from the review officially reported in the Cockpit.

If you select "no", then the review will be seen in the cockpit, but the results will not be displayed or counted in the overall metrics.

(13) Enter the criteria you want to use to determine the SLA. Additional criteria can be added to the drop-down upon request to the Master Process Admin

(14) Define the SLA in terms of the criteria. In this example, the criteria is pages and it is specified that 0-200 pages= 3 day SLA, 201-500 pages= 4 day SLA, etc.

(15) Leave blank if the review will ONLY be initiated from a Community. Otherwise, select the activities you want to make sure a user completed prior to the Review. The system will check the users DPMM Project Plan for an Actual End Date for these activities and inform the user if they are not completed.

(17) Click the "Submit" bttn and if a non-DPMM form was selected, a hyperlink will appear. Copy and paste this hyperlink on the community you would like users to initiate the review from.

URL: http://supportcentral.ge.com/projects/
sup_Task_review.asp?dpmm=no&task_id=
576142&prod_id=204698&proj_id=576117

FIG. 35

Custom Reporting Cockpit

After creating the custom screen, Leadership can choose any fields on the screen to be displayed in a Cockpit. Along with the custom fields, DPMM will also add standard fields like schedule and budget metrics.

PROJECT IMPACT AREAS

Key Business Theme: ▽
Function:
Process COE: * ▽
Tier 1 Function: * ▽
Tier 2 P&L: * ▽
Tier 3 P&L: * ▽

[Submit]

Project Summary Report

Business:
Team Member:
Key Business Theme: ▽
Function:
Proecess COE: ▽
Tier 1 Function: ▽
Tier 2 P&L: ▽
Teir 3 P&L: ▽
ss Ys:

[Run Report]    Refresh Report Data

Sort Projects By:
● Last TG Completed
○ Highest Schedule Variance
○ Nearest Launch Date

[Export to Excel]

Report Name: Project Summary Report
Report Generated on: 6/30/2004

| # | Business | Project Name | Last TG Cmpltd | Last Date Updated | Schedule +/- Days | Launch Date | Key Business Theme | Function | Process COE |
|---|---|---|---|---|---|---|---|---|---|
| | | | | | | | | | |
| | | | | | | | | | |
| | | | | | | | | | |

The result is that Leadership has the visibility they want into all their projects and therefore can focus on projects needing the most attention.

FIG. 38

SYSTEMS AND METHODS FOR MANAGING INFORMATION

BACKGROUND OF THE INVENTION

This invention relates generally to systems and methods for managing information and particularly to network-based systems and methods for managing tasks.

Organizations may have a large number of projects and a large number of teams of personnel working on different projects. For example, businesses engaging in complex deals, such as commercial financing, mergers, acquisitions and real estate transactions, generally conduct a due diligence analysis to access the financial strength, operational characteristics of a business, collateral and/or business value, management strength, industry dynamics, and the proposed structure of the transaction and the party or parties involved in the deal. The due diligence analysis facilitates the financing business to better evaluate and manage the risk associated with the deal after the transaction closes.

During a due diligence analysis, information, known as risk management (RM) information, is gathered from many sources. RM information is often complex and relates to various relevant areas of the overall transaction. Accordingly, as with any project, a number of different members from the same team, or from other teams, may need to have access to the same RM information to complete their respective project. However, often several teams may individually collect data from a plurality of different sources as part of the project analysis. Accordingly, their efforts are often duplicated, and as such, the data may be entered multiple times on multiple different systems throughout the financing business. Moreover, individual collection of such information by various persons increases the risk of overlapping data collection and decreases the time efficiency associated with each project. Further, individual reporting by one person associated with the business to other persons associated with the business increases the risk of providing inconsistent or incomplete data during the documentation process, which may result in increased cycle time and costs, inhibiting access to appropriate information by other personnel, and/or decreasing the efficiency of each person within the team. Additionally, because various teams may collect information, the information may not be centralized for future use by other teams.

Because of the time and expense associated with managing project information, at least some known companies outsource these responsibilities to an outside entity that manages this information and the duties associated therewith.

BRIEF DESCRIPTION OF THE INVENTION

In one aspect, a method for managing information is described. The method includes generating a first database in a first memory device, storing, by an administrator via a server system, a plurality of questions in the first database, where the plurality of questions relate to project information, and storing, by the administrator, a plurality of answers and a plurality of options related to the project information, where each answer corresponds to one of the plurality of questions and one of the options. The method further includes associating, by the administrator, the plurality of answers with a task by pre-defining, within the first database, the task to be performed based on the plurality of answers. The method also includes associating, by the administrator, a plurality of tools used to complete the task with the task, where the plurality of tools include at least one of templates used to manage the task, experts on the task, and frequently asked questions regarding the task. The method includes providing, via a computer, to a user, the plurality of questions and the plurality of options, receiving the plurality of answers from the second user, determining, by the computer, the task and the tools, where determining is based on the plurality of answers provided by the user, and creating at least one additional database in a second memory device.

In another aspect, a system for managing information is described. The system includes a server configured to provide, to a first user, a plurality of questions and options requiring input, receive a plurality of answers from the first user, where each answer corresponds to one of the plurality of questions and one of the options. The server is further configured to determine a task to be performed based on the plurality of answers provided by the first user, generate a first database, and create at least one additional database. The server performs at least one of generating the first database and creating the at least one additional database without making a change to at least one source code.

In yet another aspect, a method for managing information is described. The method includes creating a form comprising data fields, capturing data from a plurality of users by displaying the form on a plurality of computers used by the users, and sorting the data, where at least one of creating and sorting is performed without changing at least one source code.

BRIEF DESCRIPTION OF THE DRAWINGS

FIG. 4 shows an exemplary user interface that may be generated by using the method illustrated in FIG. 3.

FIG. 5 shows an exemplary user interface that may be generated by using the method illustrated in FIG. 3.

FIG. 7 shows an exemplary user interface that may be generated by using the method illustrated in FIG. 3.

FIG. 12 shows an exemplary user interface that may be generated by using the method illustrated in FIG. 3.

FIG. 13 shows an exemplary user interface that may be generated by using the method illustrated in FIG. 3.

FIG. 18 shows an exemplary user interface that may be generated by using the method illustrated in FIG. 3.

FIG. 24 shows an exemplary user interface that may be generated by executing the method illustrated in FIG. 3.

FIG. 30 shows an exemplary user interface that may be generated by using the method illustrated in FIG. 3.

FIG. 32 shows an exemplary user interface that may be generated by using the method illustrated in FIG. 3.

FIG. 34 shows an exemplary user interface that may be generated by using the method.

FIG. 35 shows an exemplary user interface that may be generated by using the method illustrated in FIG. 3.

FIG. 38 shows an exemplary user interface that may be generated by using the method illustrated in FIG. 3.

DETAILED DESCRIPTION OF THE INVENTION

Figure 1:
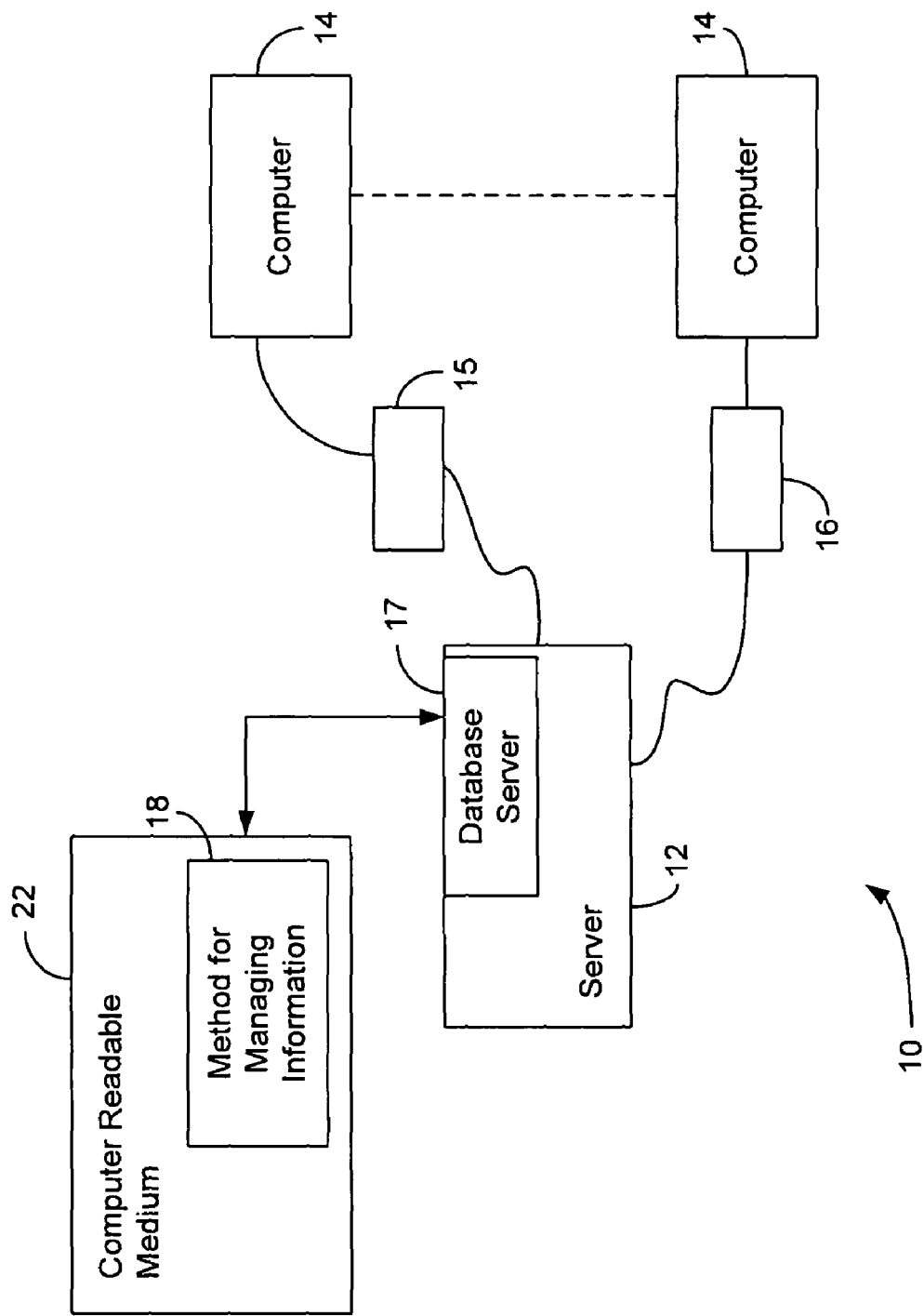
FIG. 1 is a simplified block diagram of an exemplary embodiment of a system that executes a method for managing information.

FIG. 1 is a simplified block diagram of an embodiment of a system 10 including a workflow management system, described below. System 10 includes a server system 12 and a plurality of client systems 14 connected to server system 12. An example of server system 12 is a computer in a network of computers. In one embodiment, client systems 14 are connected to server system 12 via nodes 15 and 16 of a network, such as Internet. In an alternative embodiment, client systems 14 are directly connected to server system 12 without nodes between client systems 14 and server system 12. In yet another alternative embodiment, client systems 14 are connected to server system 12 via node 15. In another alternative embodiment, client system 14 is connected to server system 12 via multiple nodes. Server system 12 is programmed to execute a computer program implementing a method 18 for managing information that is stored in a centralized computer-readable medium 22.

In one embodiment, client systems 14 are computers including a web browser, such that server system 12 is accessible to client systems 14 using the Internet. In another embodiment, client system 14 is any device, such as, a web-based phone, personal digital assistant (PDA), and other web-based connectable equipment, capable of interconnecting to the Internet. Client systems 14 are interconnected to the Internet through at least one interface. Examples of interfaces interconnecting client systems 14 to the Internet include a network, such as a local area network (LAN) and a wide area network (WAN), dial-in-connections, cable modems and special high-speed integrated services digital network (ISDN) lines. A database server 17 is connected to computer-readable medium 22. Other examples of computer-readable mediums which can be used instead of or alternatively in addition to computer-readable medium 22 include floppy discs, hard disks, digital versatile discs (DVDs), and compact discs (CDs). In one embodiment, computer-readable medium 22 is located within server system 12 and is accessed by individuals using at one of client systems 14 by logging onto server system 12 through one of client systems 14. In an alternative embodiment, computer-readable medium 22 is stored remotely from server system 12 and is non-centralized.

Figure 2:
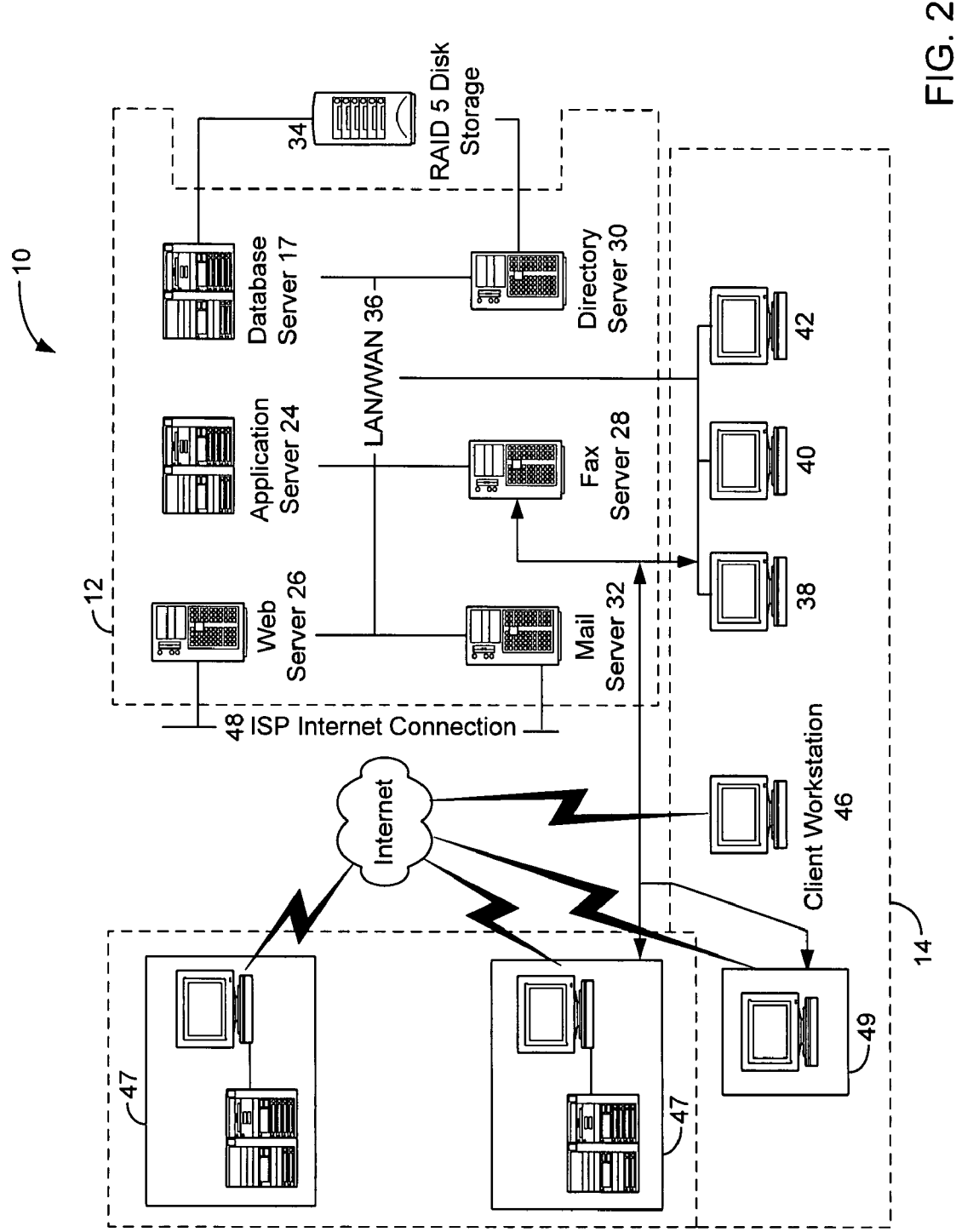
FIG. 2 is an expanded block diagram of an exemplary embodiment of the system shown in FIG. 1.

FIG. 2 is an expanded block diagram of another embodiment of system 10. System 10 includes server system 12 and client systems 14. Server system 12 further includes at least one of database server 17, an application server 24, a web server 26, a fax server 28, a directory server 30, and a mail server 32. A disk storage unit 34 is coupled to database server 17 and directory server 30. Servers 17, 24, 26, 28, 30, and 32 are coupled in a LAN 36. In addition, an administrator's workstation 38, a user workstation 40, and a supervisor's workstation 42 are coupled to LAN 36. Alternatively, workstations 38, 40, and 42 are coupled to LAN 36 using the Internet.

Each workstation, 38, 40, and 42 is a personal computer having a web browser. Although functions performed at workstations 38, 40, and 42 typically are illustrated as being performed at respective workstations 38, 40, and 42, such functions can be performed at one of many personal computers coupled to LAN 36. Workstations 38, 40, and 42 are illustrated as being associated with separate functions to facilitate an understanding of different types of functions that can be performed by individuals having access to LAN 36.

Server system 12 is configured to be communicatively coupled to a customer or client workstation 46 using an internet service provider (ISP) Internet connection 48. Although one client workstation 46 is shown, in one embodiment, server system 12 is coupled to more than one client workstations. In an alternative embodiment, instead of ISP internet connection 48, a WAN communication is utilized. In yet another alternative embodiment, instead of LAN 36, WAN 37 is used. Authorized individuals, such as employees, having a workstation 47 can access server system 12 via ISP Internet connection 48 or alternatively via a WAN.

Client system 14 includes a manager workstation 49 located at a remote location. Workstations 46, 47 and 49 are personal computers having a web browser. Furthermore, fax server 28 communicates with remotely located client systems including manager workstation 49 by using a telephone link. Fax server 28 is configured to communicate with workstations 38, 40, and 42 as well.

Any of server system 12 and client system 14 is programmed to execute method 18 for managing information, and as used herein, the term computer is not limited to those integrated circuits referred to in the art as computers, but broadly refers to processors, microcontrollers, microcomputers, programmable logic controllers, application specific integrated circuits, and other programmable circuits.

Moreover, as used herein, the term personal computer is not limited to those integrated circuits referred to in the art as computers, but broadly refers to processors, microcontrollers, microcomputers, programmable logic controllers, application specific integrated circuits, and other programmable circuits.

Figure 3:
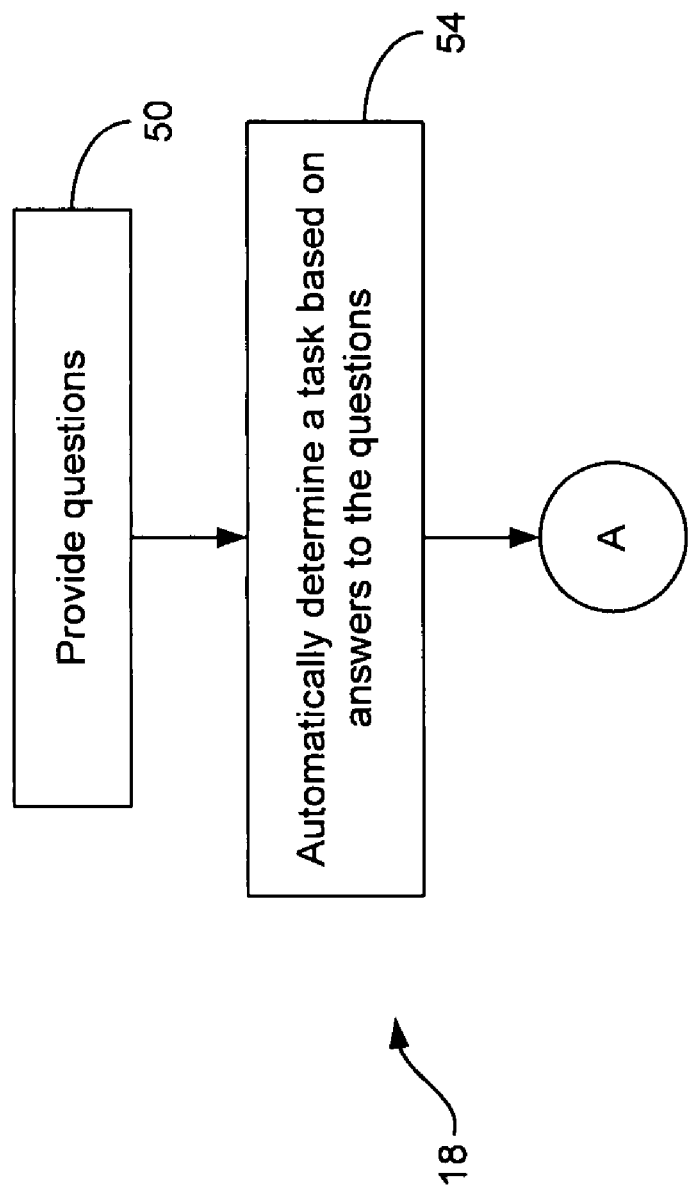
FIG. 3 is a flowchart of an exemplary method for managing information.
Figure 5:
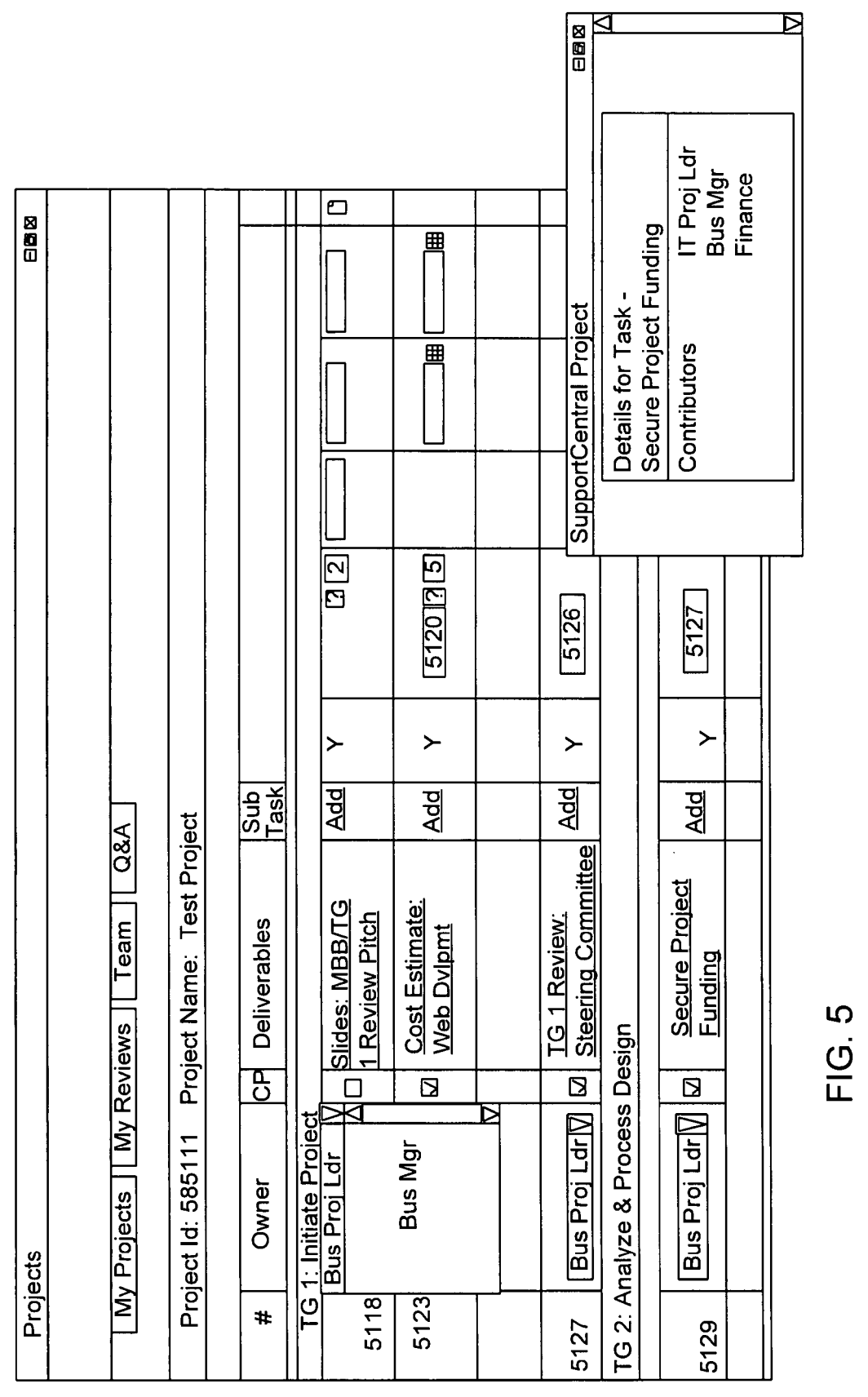
Figure 6:
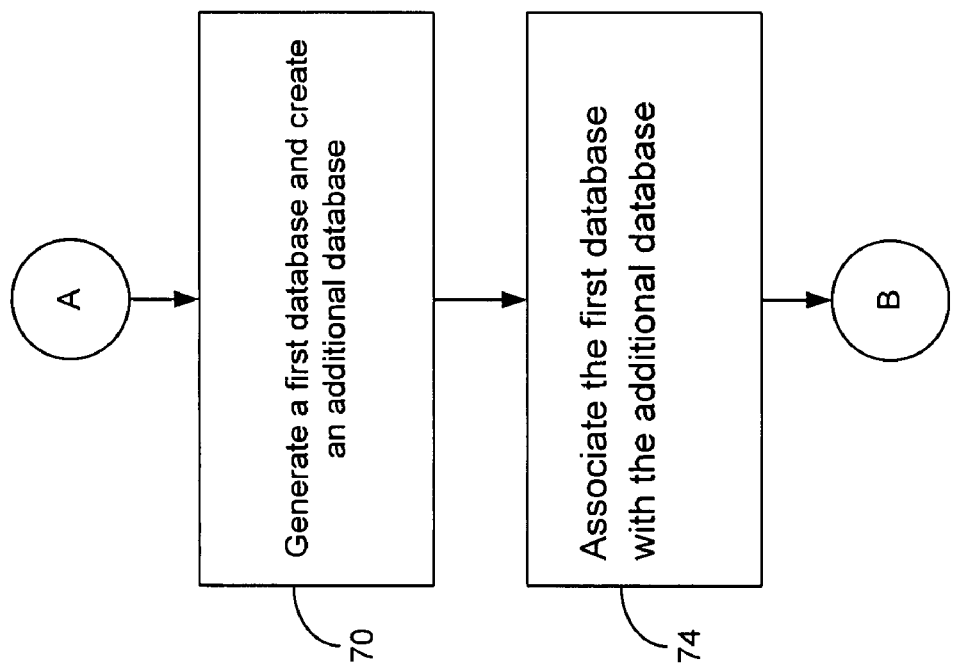
FIG. 6 is a flowchart of the method for managing information.

FIG. 3 is a flowchart of an embodiment of method 18 and FIGS. 4-6 illustrate user interfaces generated by executing method 18. As illustrated in FIG. 4, server system 12 provides 50, to a first user, a plurality of questions, such as, "What is your best guess at what this project might cost to implement (in USD)?" and "Is your project an ERP project?". Server system 12 also provides, to the first user, options, such as '<10K', '11-25K', '26-50K', and "Yes—Full ERP Implementation". Server system 12 automatically determines 54 a plurality of tasks, including a task, such as "Write/Update Business Reqmnts Document", to be performed based on a plurality of answers provided by the first user in response to the plurality of questions. Some of the plurality of tasks are included within a project. Examples of the plurality of tasks include "Build Project Team", "Modify Online Project Plan", and "Write/Update Business Reqmnts Document". Other examples of the plurality of tasks include the risk management information and actions performed to build real estate, such as a house and/or an office building. Additional examples of the plurality of tasks include actions performed to buy the real estate, sell the real estate, develop a web site, sell insurance, draft a patent application, publish a book, and write a software. The plurality of answers are selected from the options provided to the first user. The first user selects a hyperlink representing the task to receive a plurality of tools to be used to complete the task. Examples of the tools include generalized templates to be used to manage the task, examples of templates that have been used to manage the task, links related to the task, experts on the task, frequently asked questions regarding the task, and documents regarding the task. The first user contacts the experts if the first user has questions regarding the task.

In an alternative embodiment, the first user changes a number of the plurality of answers to the plurality of questions. Server system 12 changes a number of the plurality of tasks to be performed by the first user based on the changes made to the number of the plurality of answers. When the first user changes the number of the plurality of answers, server system 12 does not make changes to a number of the plurality of tasks that have been started and/or completed by the first user.

In another alternative embodiment, as illustrated in FIG. 5, server system 12 categorizes the plurality of tasks into a plurality of phases, such as five phases "TG 1-5". The task has an owner, which is a role of a person responsible for completing the task. Examples of the owner include "Bus Proj Ldr", which stands for business project leader, and "Bus Mgr", which stands for business manager. In yet another alternative embodiment, the owner is a name of the person and the name is changed by the first user. The task also has contributors, such as "Bus Mgr" and 'Finance', who are designated to provide a contribution to the task.

In yet another alternative embodiment, when the first user selects at least one of the plurality of answers from the options, server system 50, based on the at least one answer, removes at least one of remaining of the plurality of questions yet to be answered by the first user and some of the options corresponding to the at least one question. For example, as illustrated in FIG. 4, when the first user answers 'Q1' and 'Q2', server system 50 removes a question 'Q4' (not shown), and at least one option (not shown) that includes an answer to 'Q4'.

In still another alternative embodiment, when the first user selects at least one of the plurality of answers, server system 50, based on the at least one answer, provides additional questions and additional options corresponding to the additional questions to the first user. For example, as illustrated in FIG. 4, when the first user answers 'Q1', server system 50, provides to the first user, the question 'Q4' and some of the additional options that include an answer to 'Q4'. The additional options include supplementary answers. When the first user selects the supplementary answers from the additional options, server system 50 automatically determines 54 the plurality of tasks to be performed based on the supplementary answers.

If the task is designated as a critical path (CP) by server system 12, the task negatively impacts a schedule of the project if the task is not completed on time. For example, if "TG 1 Review: Steering Committee" is not completed on time, the 'TG2'" phase is delayed. Therefore, it is critical to complete "TG 1 Review: Steering Committee" on time. An administrator, such as an expert, of the task determines whether the task is to be designated as the critical path before server system 12 automatically determines 54 the task. In an alternative embodiment, the first user makes changes to the designation of the task as the critical path after server system 12 automatically determines 54 the task and provides the task to the first user.

As illustrated in FIG. 4, the task is associated with a pre-requisite task designated by a pre-requisite number, such as "91663", to indicate to the first user that the pre-requisite task should be completed before starting the task. In an alternative embodiment, the task is associated with a plurality of pre-requisite tasks to indicate to the first user that the pre-requisite tasks should be completed before starting the task. In another alternative embodiment, the first user changes a number of the plurality of pre-requisite tasks that are associated with the task. As illustrated in FIG. 4, the first user changes the number of the plurality of the pre-requisite tasks associated with the task by selecting a link, such as '?', located adjacent to the pre-requisite number.

As illustrated in FIG. 4, server system 12 provides a number of days, such as '120' shown under "Days to cmplt task", to complete the task to the first user. An example of the number of days to complete the task is a number of consecutive business days to complete the task. Before server system 12 automatically determines the task, the administrator determines the number of days to complete the task based on an experience of the administrator. In an alternative embodiment, the first user changes the number of days to complete the task after server system 12 automatically determines 54 the task. As illustrated in FIG. 4, when the first user enters a planned start date, such as '12/03/2001', server system 12 automatically calculates remaining planned start dates, such as '12/4/2001' and '5/27/2002', and planned end dates, such as '12/12/2001' and '6/24/2002', for the project.

As illustrated in FIG. 5, the first user selects a notes icon, shown under 'Notes', associated with the task and adds comments regarding the task. The first user adds the comments in a box that appears when the first user selects the notes icon. The first user enters, within the box, a name of a review person, such as the administrator. The first user enters the name of the review person in a list to whom the first user intends to send the comments. When the first user selects a send button within the box, server system 12 sends the comments to the review person in the list via electronic mail. The review person in the list responds by approving or alternatively disapproving the comments, and sends the response to the first user via the electronic mail. The response of the review person and a time of sending the response are logged in a notes section associated with the task.

A second user, such as the administrator, documents an amount of the plurality of tasks of a process. For example, the second user creates a document, such as a Microsoft® Excel document, that describes the tasks within the amount of the plurality of tasks. Examples of the process include a procedure for obtaining a patent and a procedure for new product introduction (NPI). In an alternative embodiment, the second user categorizes some of the amount of the plurality of tasks into the plurality of phases.

Figure 8:
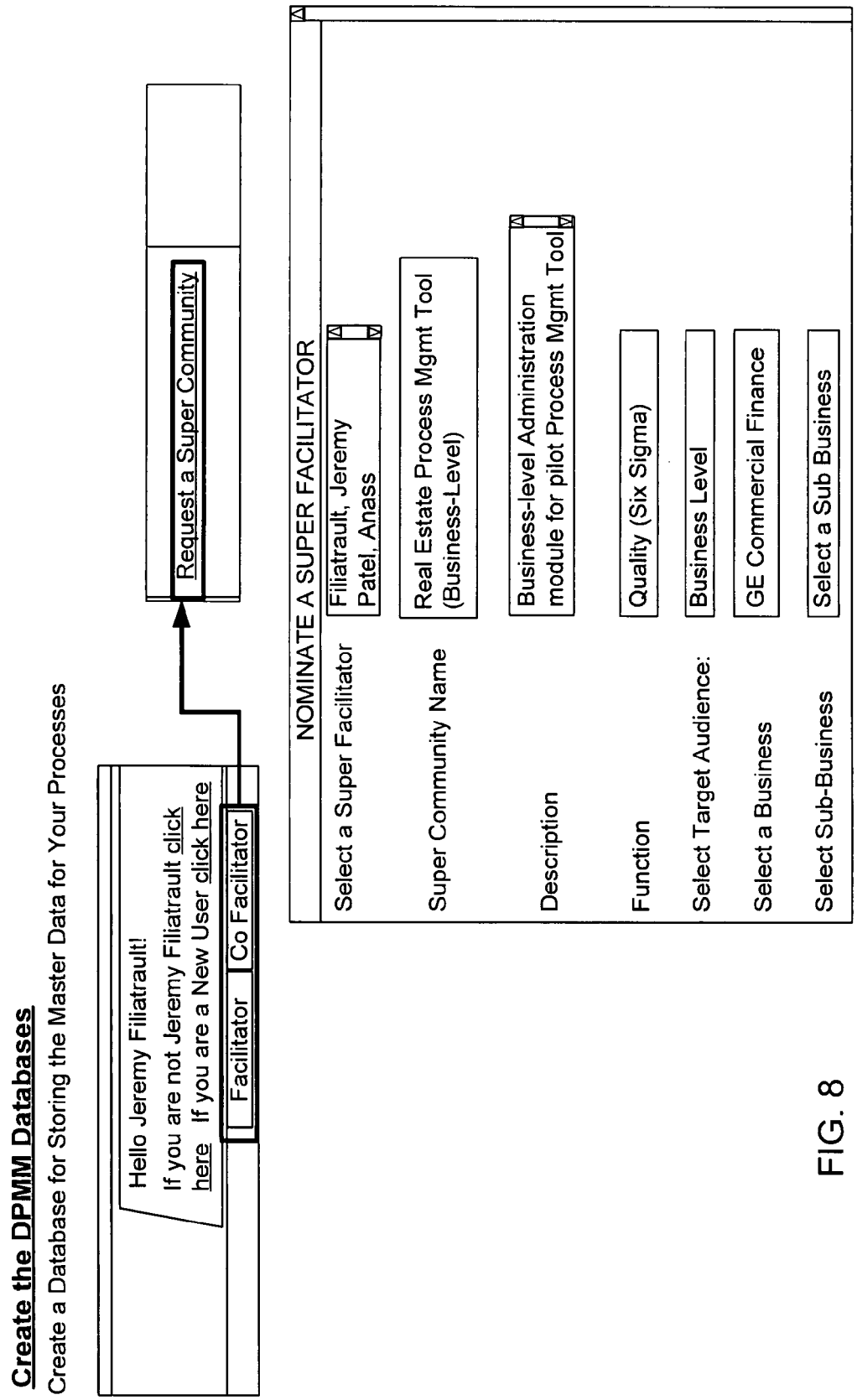
FIG. 8 shows an exemplary user interface that may be generated by using the method illustrated in FIG. 3.
Figure 9:
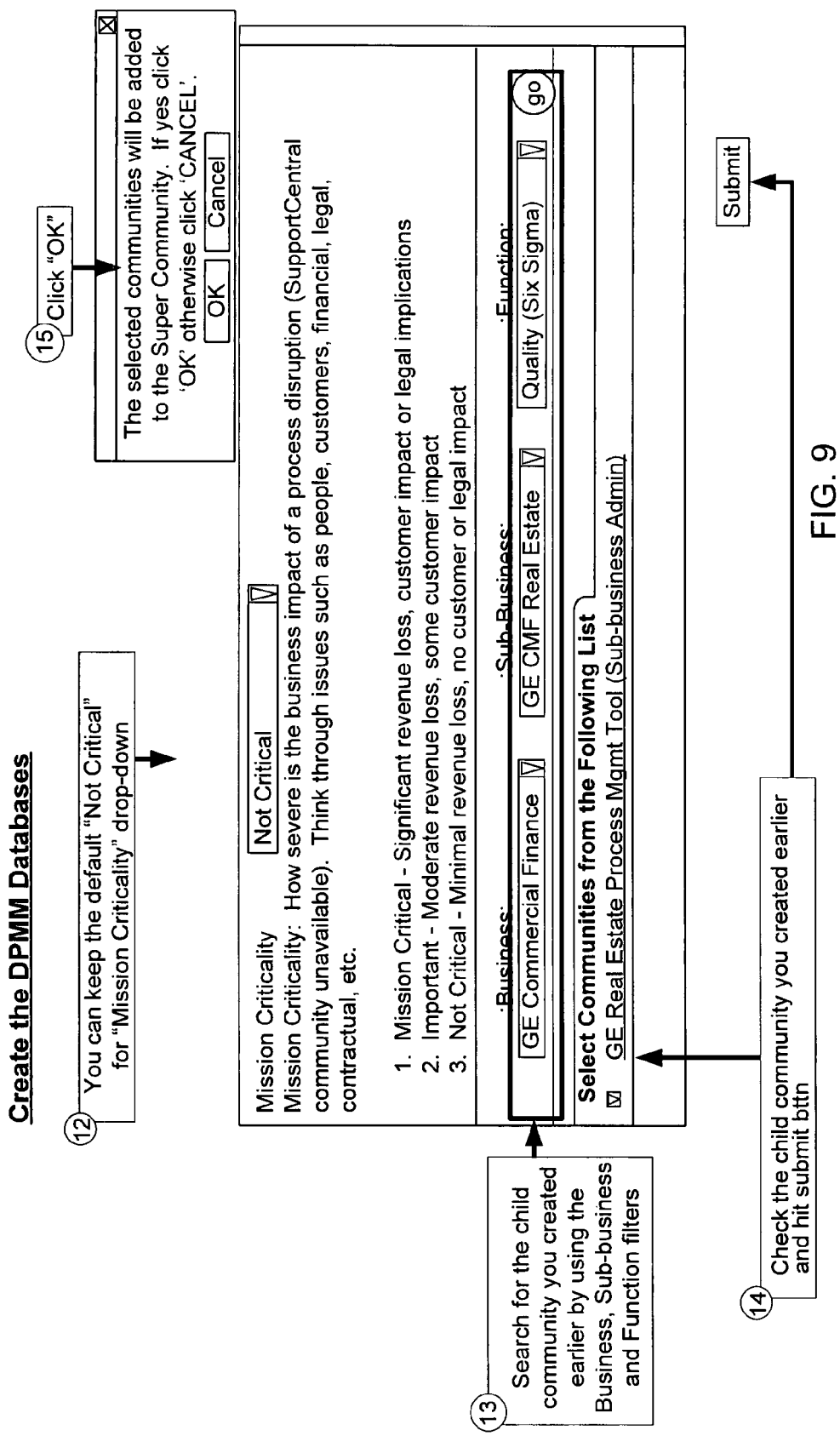
FIG. 9 shows an exemplary user interface that may be generated by using the method illustrated in FIG. 3.

FIG. 6 is a flowchart of method 18 and FIGS. 7-9 illustrate user interfaces generated by executing method 18. The second user generates 70 a first database and creates 70 an additional database. An example of the first database is a master database. An example of each of the first and the additional database includes a uniform resource locator (URL) address on the World Wide Web. For example, the first database is generated at a URL address that is different than a URL address of the additional database. Another example of each of the first and the additional database includes a location on computer readable-medium 22. For example, the first database is generated at a first address on computer-readable medium 22 and the additional database is generated at a second address on computer-readable medium 22. As another example, the first database is generated at the first address on computer-readable medium 22 and the additional database is created at a third address on another computer-readable medium, such as disk storage unit 34, located at a different, such as a remote, location from computer-readable medium 22.

As illustrated in FIG. 7, the second user creates 70 the additional database by selecting a new community button, such as "Form a New Community" button on a central web page. When the second user selects the new community button, server system 12 generates a new community form, such as a form titled "Create a New Community". The second user enters a name of a community and a description of the community in the new community form. The community represents the additional database. The second user also enters a name of a facilitator, such as "Filiatrault, Jeremy", and a co-facilitator, such as "Patel, Anass", who have rights to edit data, such as the plurality of tasks, within the additional database. The second user selects a "sub-business level", as a target audience that uses method 18. The second user selects a business, such as "GE Commercial Finance", which stands for General Electric® Commercial Finance, and a sub-business, such as "GE CMF Real Estate", which stands for General Electric® Commercial Finance Real Estate, within the business. The name of community describes the sub-business. The business and the sub-business selected use method 18. The second user selects a number of community experts within the community. The community experts approve a creation of the community. The community experts include the facilitator and the co-facilitator.

When the second user selects a submit button on the new community form, server system 12 automatically sends a confirmation message to the second user and server system 12 automatically sends electronic mails to the community experts. The community experts receive the electronic mails that include a URL to an approval web page. The community experts approve the creation of the community by selecting an approval button on the approval web page. The community is created when the community experts approve the creation of the community. The second user creates 70 the additional database without changing a source code for creating the additional database because the additional database is created by accessing and entering information, such as the name and description of the community, on the new community form, and by obtaining the approval from the community experts. The second user deletes the additional database without changing a source code for deleting the additional database because the second user selects the additional database and selects a button, such as a delete button, to remove the additional database.

The second user generates 70 the first database by selecting super community links, such as 'Facilitator' and "Request a Super Community" on the central web page. As illustrated in FIG. 8, when the second user selects the super community links, server system 12 generates a super community form, such as a form titled "Nominate a Super Facilitator". The second user enters a name of the administrator, such as "Filiatrault, Jeremy" and "Patel, Anass", who have rights to edit data, such as the plurality of tasks, within the first database. The second user also enters a name of a super community and a description of the super community on the super community form. The super community represents the first database. The name of the super community describes the business. The second user selects a level, such as "Business Level", of a target audience that uses method 18. The second user also selects the business, such as "GE Commercial Finance", which uses method 18. The second user generates 70 the first database without changing a source code for creating the first database because the first database is generated by accessing and entering information, such as the name and description of the super community, on the super community form.

The second user associates 74 the first database with the additional database by searching for the community. The second user searches for the community by selecting the business, such as "GE Commercial Finance", the sub-business, such as "GE CMF Real Estate", of the community, and a function, such as "Quality (Six Sigma)" of the community. As illustrated in FIG. 9, server system 12 searches for the community to generate the name, such as "GE Real Estate Process Management Tool (Sub-business Admin)", of the community. The second user selects a box next to the name of the community and selects a submit button on the super community form. When the second user selects the submit button on the super community form, server system 12 generates a dialog box stating, "The selected communities will be added to the Super Community". When the second user selects an 'OK' button on the dialog box, server system 12 associates 74 the first database with the additional database by associating the community with the super community. The second user associates 74 the first database with the additional database without changing a source code for associating the first database with the additional database because the first database is associated with the additional database by searching for the community on the super community form, selecting the box next to the name of the super community on the super community form, and by selecting the 'OK' button on the dialog box.

In an alternative embodiment, the second user creates additional databases in the same manner described above for creating 70 the additional database. The additional databases are represented and managed by additional communities describing sub-businesses that are divisions of the business. The second user also associates the additional databases with the first database in the same manner described above for associating 74 the additional database with the first database.

Figure 10:
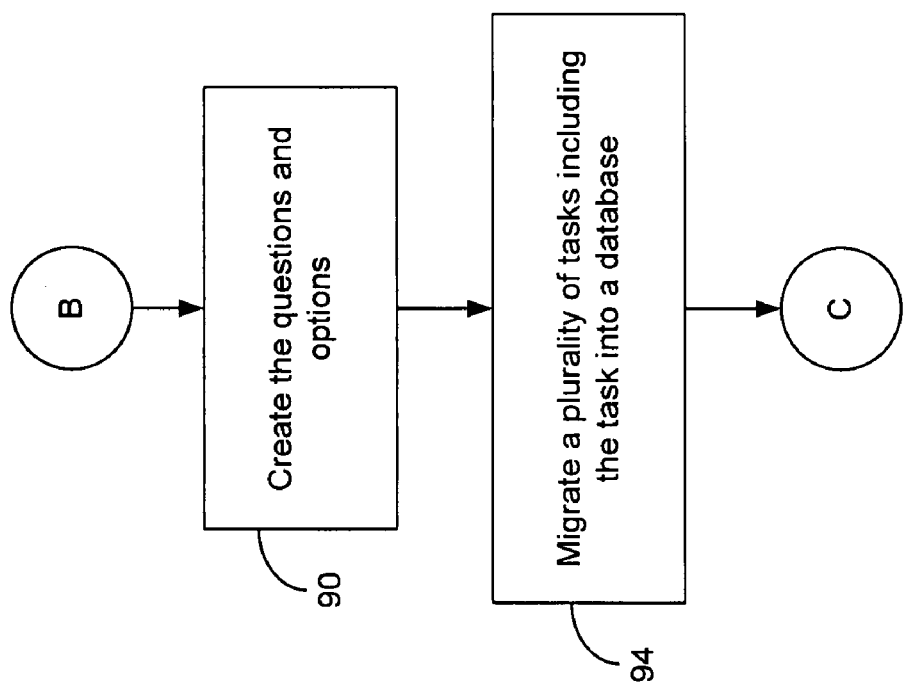
FIG. 10 is a flowchart of the method for managing information.
Figure 11:
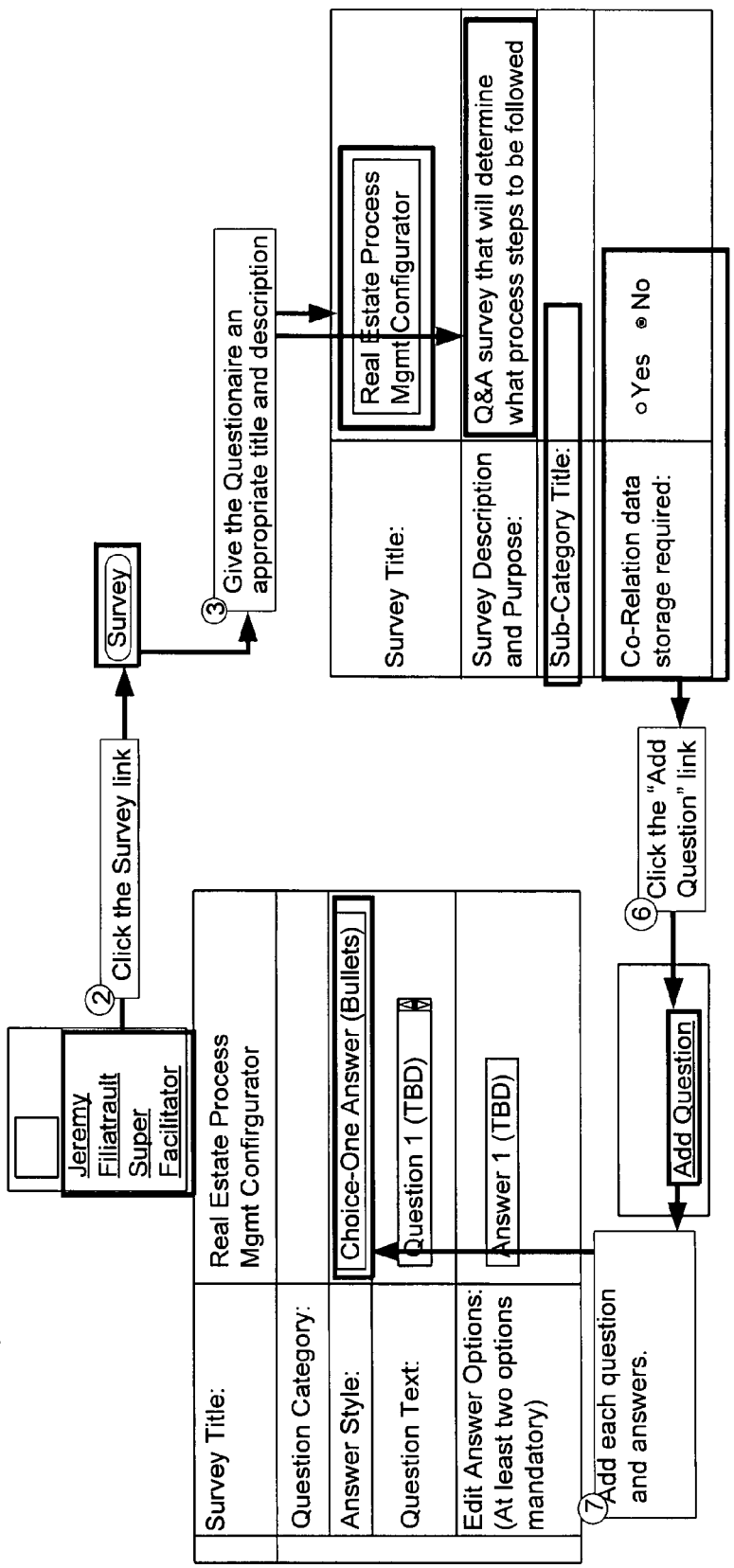
FIG. 11 shows an exemplary user interface that may be generated by using the method illustrated in FIG. 3.

FIG. 10 is a flowchart of method 18 and FIGS. 11-15 illustrate user interfaces generated by executing method 18. As illustrated in FIG. 11, the second user creates 90 the plurality of questions and the options within the first database by selecting a link, such as a 'survey' link, providing a title and a description to one of the plurality of questions, selecting another link, such as an "Add Question" link, and providing the one of the plurality of questions and some of the options corresponding to the one of the plurality of questions. The second user migrates 94 the plurality of tasks including the task into the first database. As illustrated in FIG. 12, the second user migrates 94 the plurality of tasks by opening the document, such as the Microsoft® Excel document, making desired changes to the plurality of tasks within the document, accessing the first database, selecting multiple links, such as a 'Projects' link and a "Create Project Using Template" link, and downloading the document into the first database.

Figure 14:
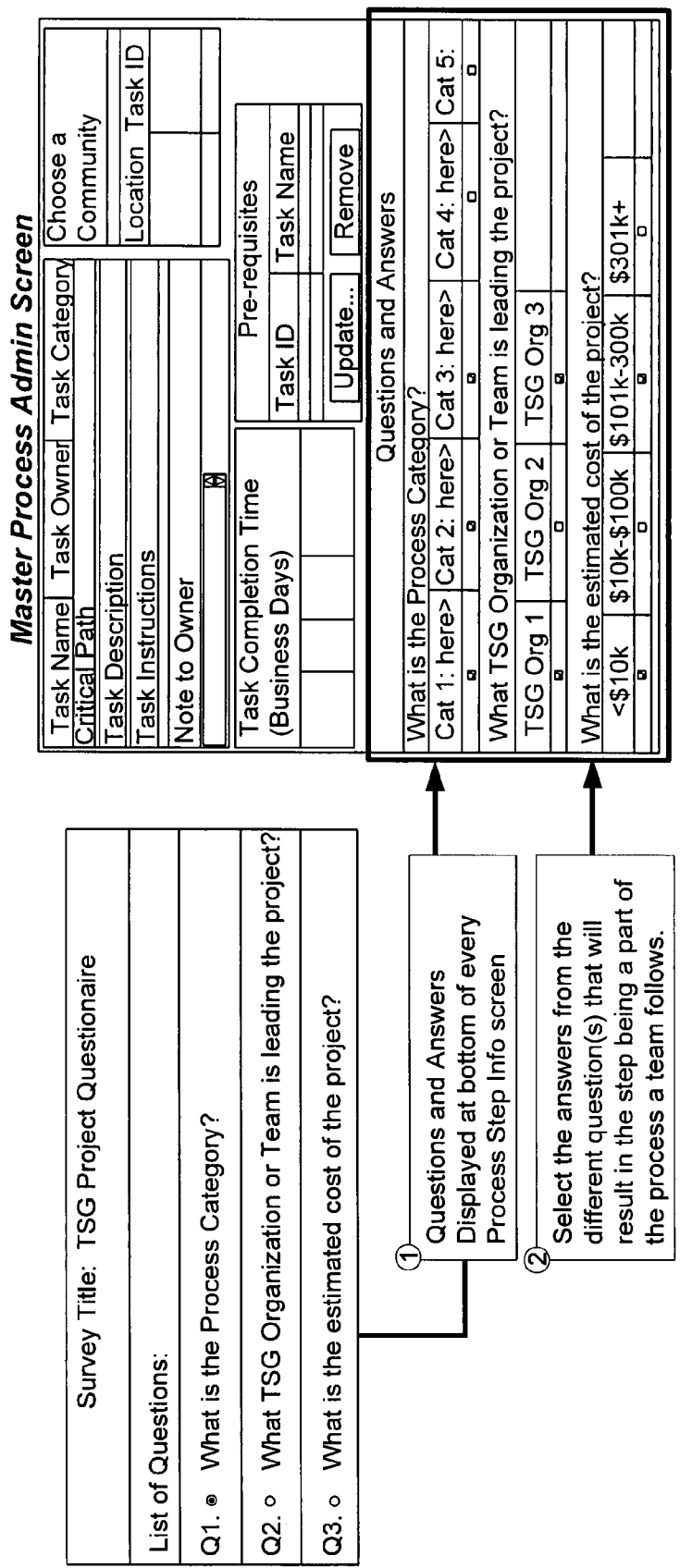
FIG. 14 shows an exemplary user interface that may be generated by using the method illustrated in FIG. 3.

In an alternative embodiment, as illustrated in FIG. 13, the second user enters remaining data within the plurality of tasks by accessing the plurality of tasks within the first database, selecting the task, such as "Project Entry in BPTS & TSG . . . " to access a process screen, such as a "Master Process Admin Screen", and providing the remaining data. As an example, the second user accesses the plurality of tasks within the first database by selecting "View All Tasks" within the first database. When the second user creates the plurality of questions and options within the first database, server system 12 automatically attaches the plurality of questions and options at the bottom of the process screen displaying the task within the first database. As illustrated in FIG. 14, the second user associates the plurality of answers with the task by selecting the answers from the options, and saves the plurality of answers within the first database by selecting 'save'. The plurality of questions and answers are customized for the task. For example, the second user creates another set of questions and another set of options including another set of answers for another task and server system 12 attaches the other set of questions and the other set of options with the other task. The second user selects the other set of answers from the options after server system 12 attaches the other set of questions with the other task.

The second user associates the plurality of tools with the plurality of tasks. As an example, the second user accesses the plurality of tasks within the first database, stores the plurality of tools in the first database, and hyperlinks the plurality of tasks with the plurality of tools. For example, the second user accesses an act of drafting claims of a patent application regarding turbine engines from the first database, stores a document including prior drafted claims regarding turbine engines in the first database, and hyperlinks the act with the document.

The process screen includes a first question, "What is the process category?", a second question, "What TSG Organization or Team is leading the project?", and a third question, "What is the estimated cost of the project?". Server system 12 performs a first operation of an answer, provided by the first user, to the first question with remaining answers, provided by the first user, to the second and third questions. As an example, server system 12 performs an AND operation on an answer to the first question and an answer of any of the second and third questions. Server system 12 performs a second operation on an answer, provided by the first user, to the second question and an answer, provided by the first user, to the third question. For example, server system 12 performs an OR operation on an answer, provided by the first user, to the second question, and an answer, provided by the first user, to the third question. Server system 12 performs a third operation on an answer, provided by the first user, to the first question, and additional answers, provided by the first user, to the first question. For example, server system 12 performs an OR operation on an answer, provided by the first user, to the first question, and additional answers, provided by the first user, to the first question. If the first user does not answer the first question, server system 12 performs a fourth operation on an answer, provided by the first user, to the second question, and an answer, provided by the first user, to the third question. For example, server system 12 performs an OR operation on an answer, provided by the first user, to the second question, and an answer, provided by the first user, to the third question. In an alternative embodiment, the first operation is an OR operation. In another alternative embodiment, the second operation is an AND operation, In yet another alternative embodiment, the third operation is an AND operation. In an alternative embodiment, the fourth operation is an AND operation. Server system 12 provides one of the plurality of tasks based on a result derived by performing at least one of the first, second, third, and fourth operations.

Figure 15:
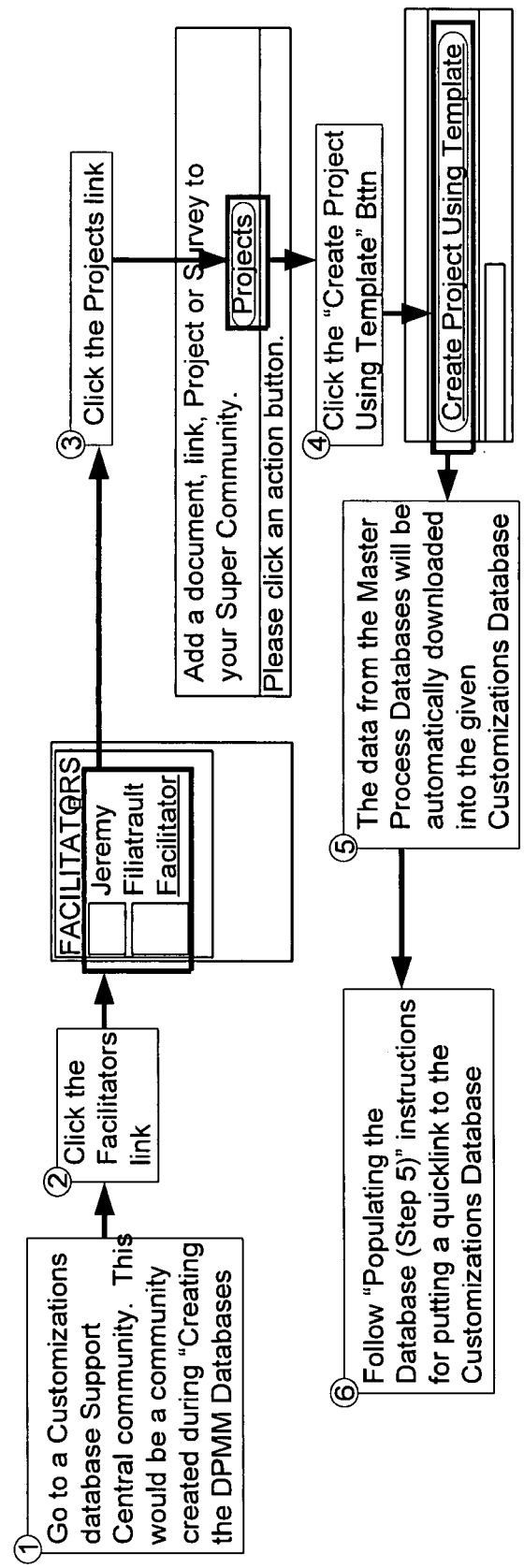
FIG. 15 shows an exemplary user interface that may be generated by using the method illustrated in FIG. 3.

As illustrated in FIG. 15, the first user populates the additional database by accessing the additional database, selecting a link, such as a 'Projects' link, and selecting another link, such as a 'Create Project Using Template" link, to automatically download the plurality of tasks from the first database into the additional database. In an alternative embodiment, the first user populates the additional database when the second user migrates the plurality of tasks into the first database. In an alternative embodiment, the first user populates the additional databases in the same manner in which the additional database is populated.

Figure 16:
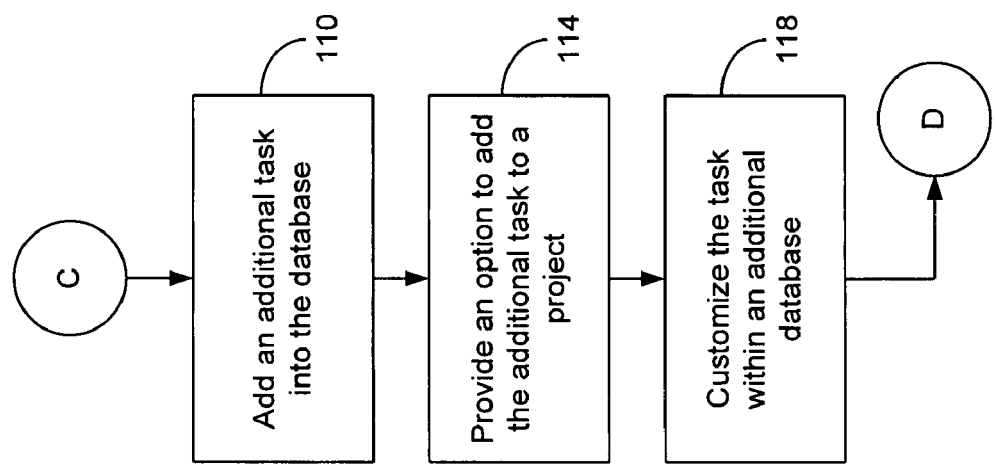
FIG. 16 is a flowchart of the method for managing information.
Figure 17:
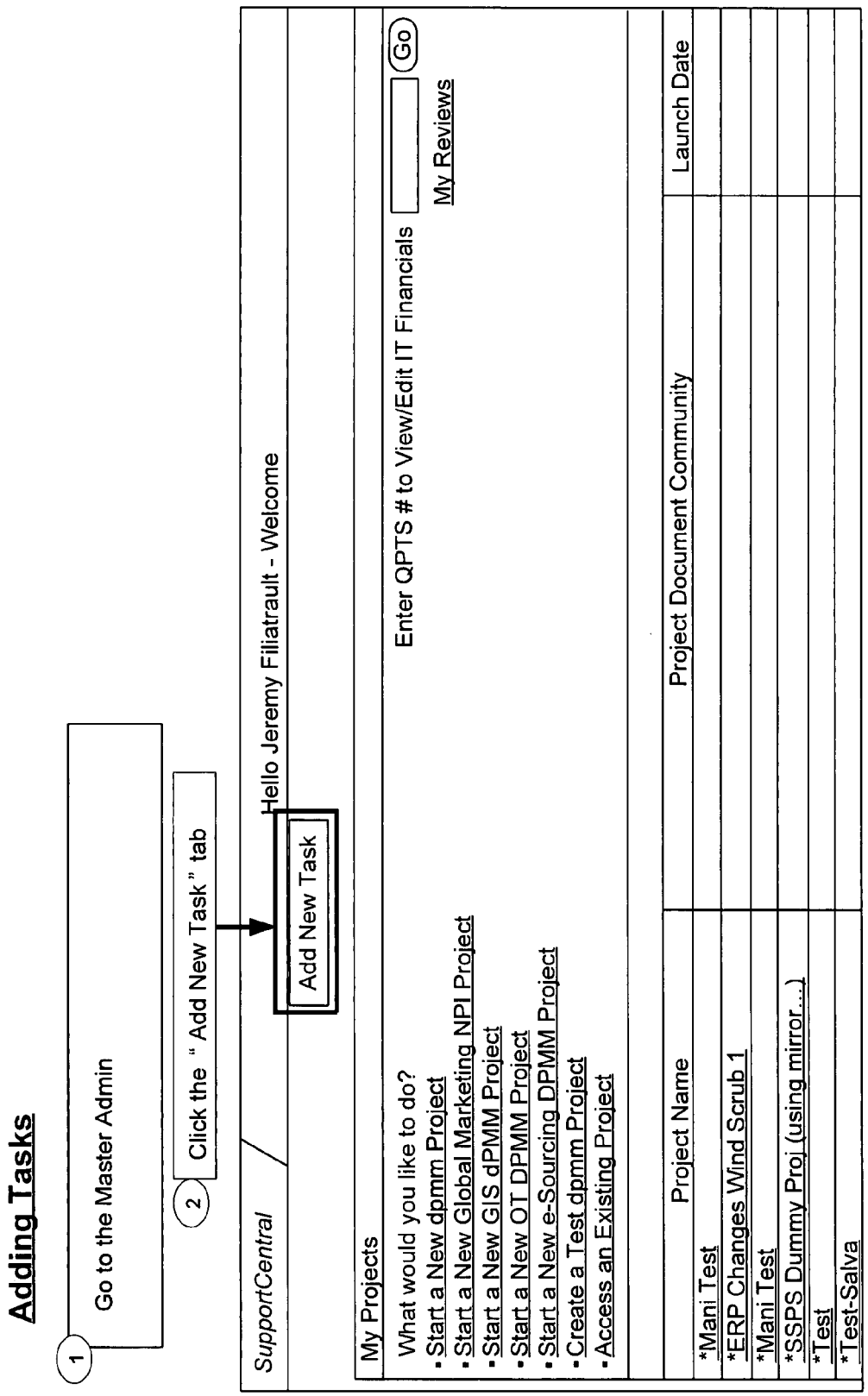
FIG. 17 shows an exemplary user interface that may be generated by using the method illustrated in FIG. 3.
Figure 18:
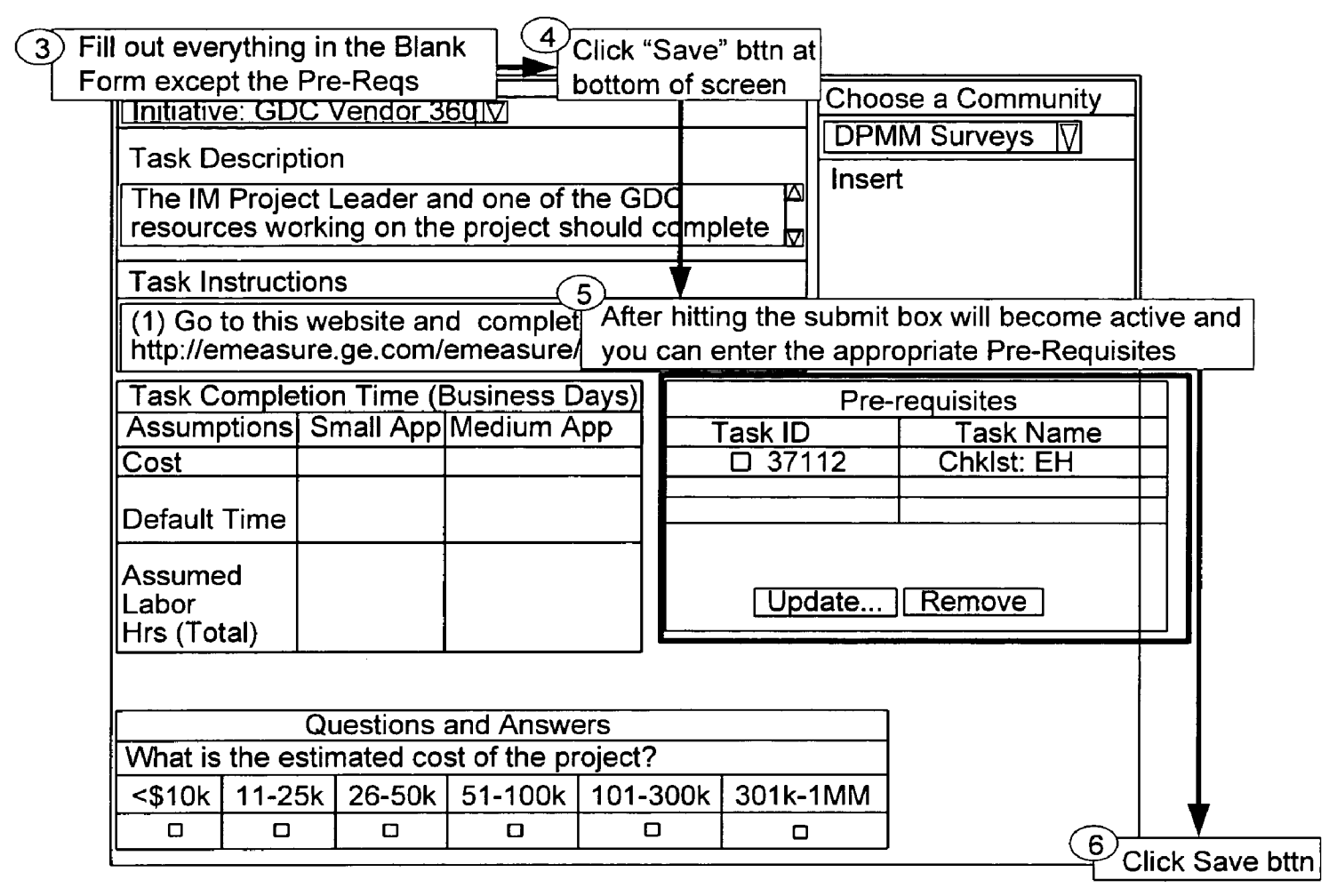

FIG. 16 is a flowchart of method 18 and FIGS. 17-21 illustrate user interfaces generated by executing method 18. As illustrated in FIG. 17, the second user adds 110 an additional task into the first database by accessing a tab, such as an "Add New Task" tab. As illustrated in FIG. 18, when the second user accesses the tab, server system 12 generates a task box. The second user enters information regarding the additional task in fields, such as 'Task Description' and 'Task Instructions', within the task box, and selects a button to save the information.

When the second user adds 110 the additional task into the first database, server system 12 automatically communicates the additional task to the additional database. In an alternative embodiment, when the second user adds 110 the additional task into the first database, server system 12 automatically communicates the additional task to some of the additional databases that are associated with the first database.

Figure 19:
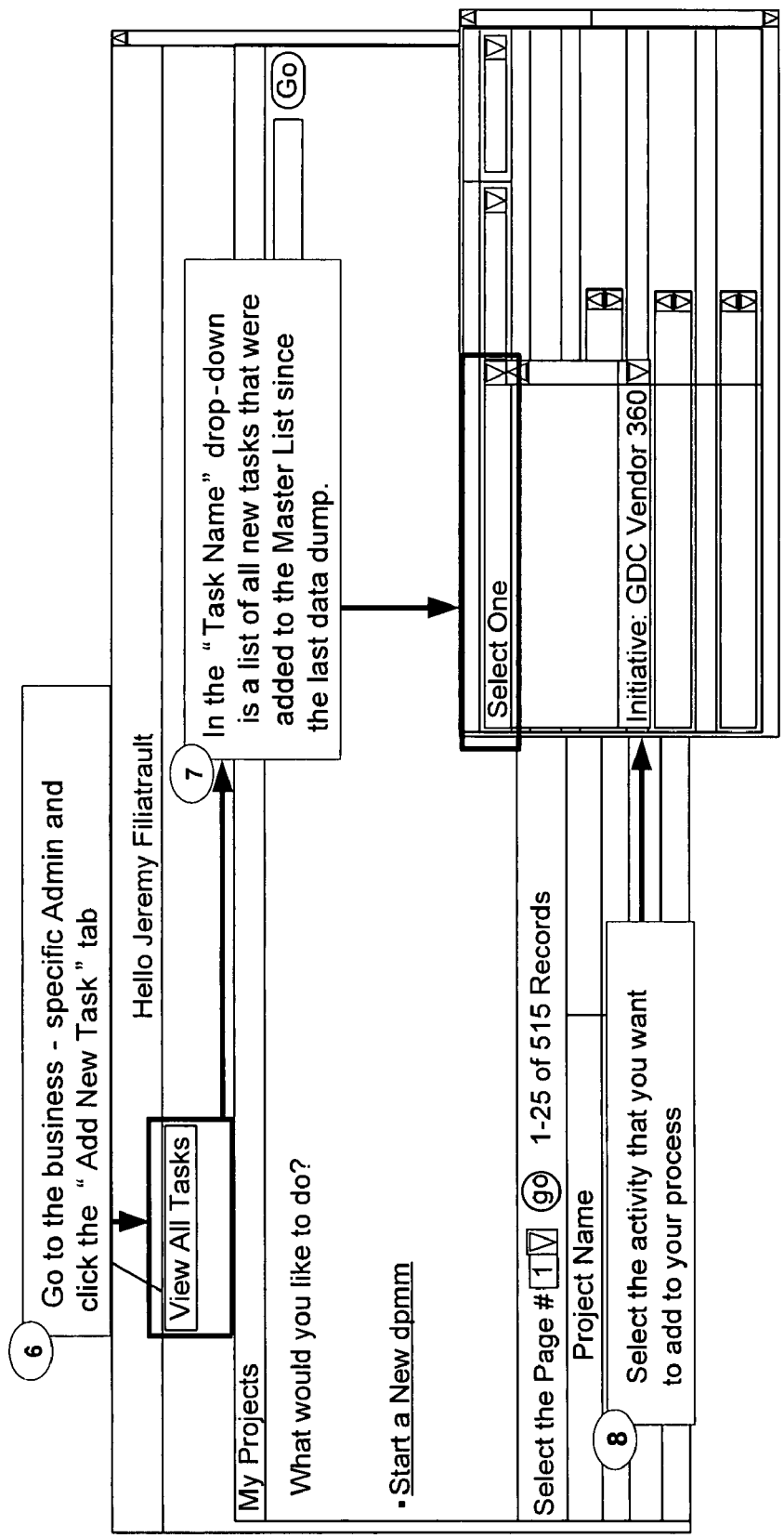
FIG. 19 shows an exemplary user interface that may be generated by using the method illustrated in FIG. 3.
Figure 20:
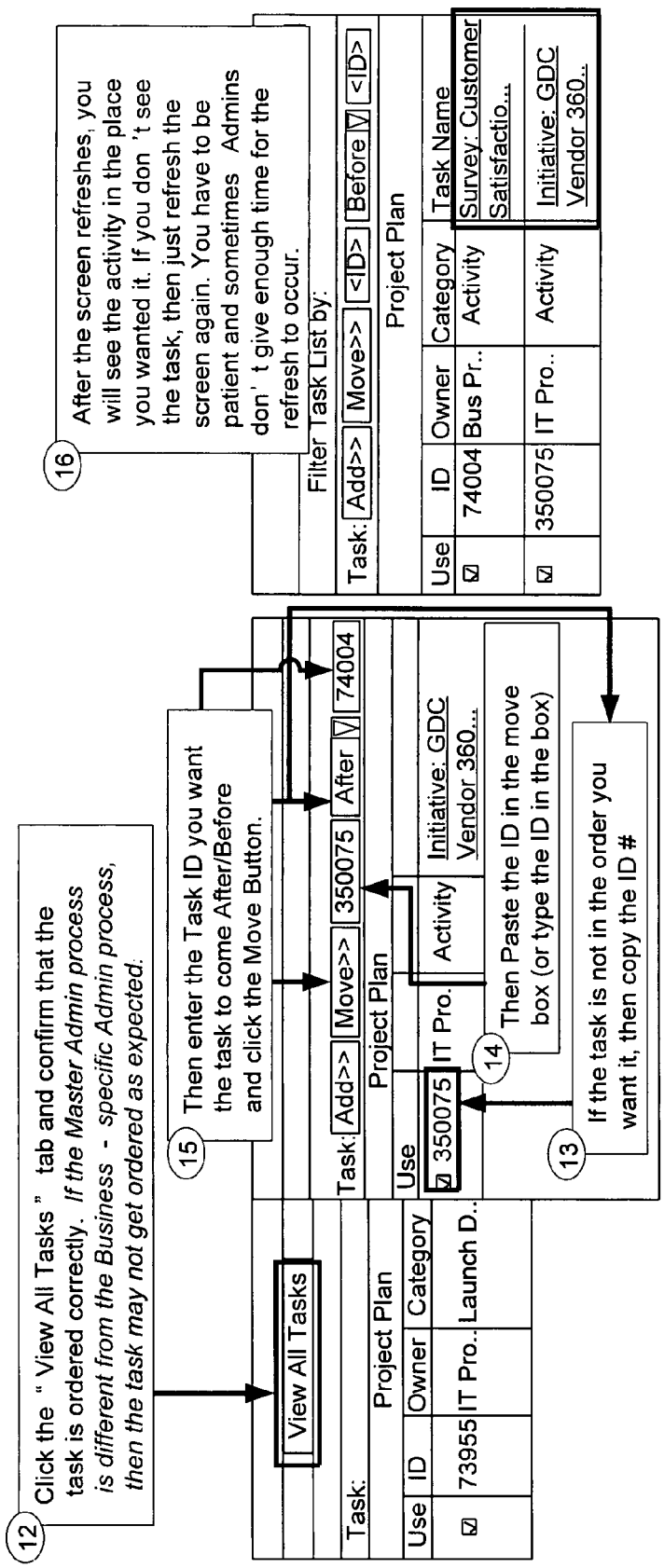
FIG. 20 shows an exemplary user interface that may be generated by using the method illustrated in FIG. 3.

When the second user adds 110 the additional task into the first database, server system 12 provides 114 an option to the first user to add the additional task to the project that includes some of the plurality of tasks. The first user accesses the option to add the additional task to the project by accessing the additional database and accessing a drop-down list. As illustrated in FIG. 19, the first user accesses the drop-down list by selecting a tab, such as a "View all Tasks" tab. From the drop-down list, the first user selects the additional task, such as 'Initiative: GDC Vendor 360', which the first user desires to add to the project. When the first user selects the additional task from the drop-down list, server system 12 generates a screen displaying information regarding the task and the first user customizes 118 the additional task by making intended changes to information regarding the additional task on the screen. The first user saves the intended changes made to the additional task. If the first user does not choose the option of adding the additional task to the project within the additional database, the additional task is added within the additional database but not added to the project.

In an alternative embodiment, the second user cannot make changes to a name of the task, a description of the task, and a category of the task without accessing the task in the first database. The second user cannot make changes to the name, the description, and the category of the task in the additional database but can make the changes in the first database. Examples of the category of the task include meeting and sign-off. In another alternative embodiment, the first user cannot add the task and/or the additional task to the additional databases without adding the task and/or the additional task to the first database.

In an alternative embodiment, an order of execution of the additional task within the additional database is different than an order of execution of the additional task within the first database. If the order of execution of the additional task in the additional database is different than that in the first database, the first user changes the order of the execution of the task in the additional database to match the order within the first database. As an example illustrated in FIG. 20, the first user accesses the additional task of the project within the additional database, copies an identification number of the additional task to a first field, copies an identification number of any remaining task within the project to a second field, and selects a move button located between the first and second fields to move the additional task after the remaining task. If the second user moves the additional task within the first database to a particular location, such as a location preceding an existing task, server system 12 moves the additional task within the additional database to the particular location.

If the first user deselects a check mark under 'Use', the task, such as 'LAUNCH: Launch Application' is not added to projects within the additional database that are added to the additional database after the check mark is deselected. If the first user deselects the check mark, the task remains within any existing projects within the additional database. The existing projects exist in computer-readable medium 22 during the de-selection of the check mark.

The second user cannot delete the task if the task is located within one of the existing projects. In an alternative embodiment, the second user deletes the task regardless of whether the task is within one of the existing projects. The second user deletes the task by accessing the first database, accessing the task within the first database, selecting a radio button next to the task, and selecting a delete button after selecting the radio button.

Figure 21:
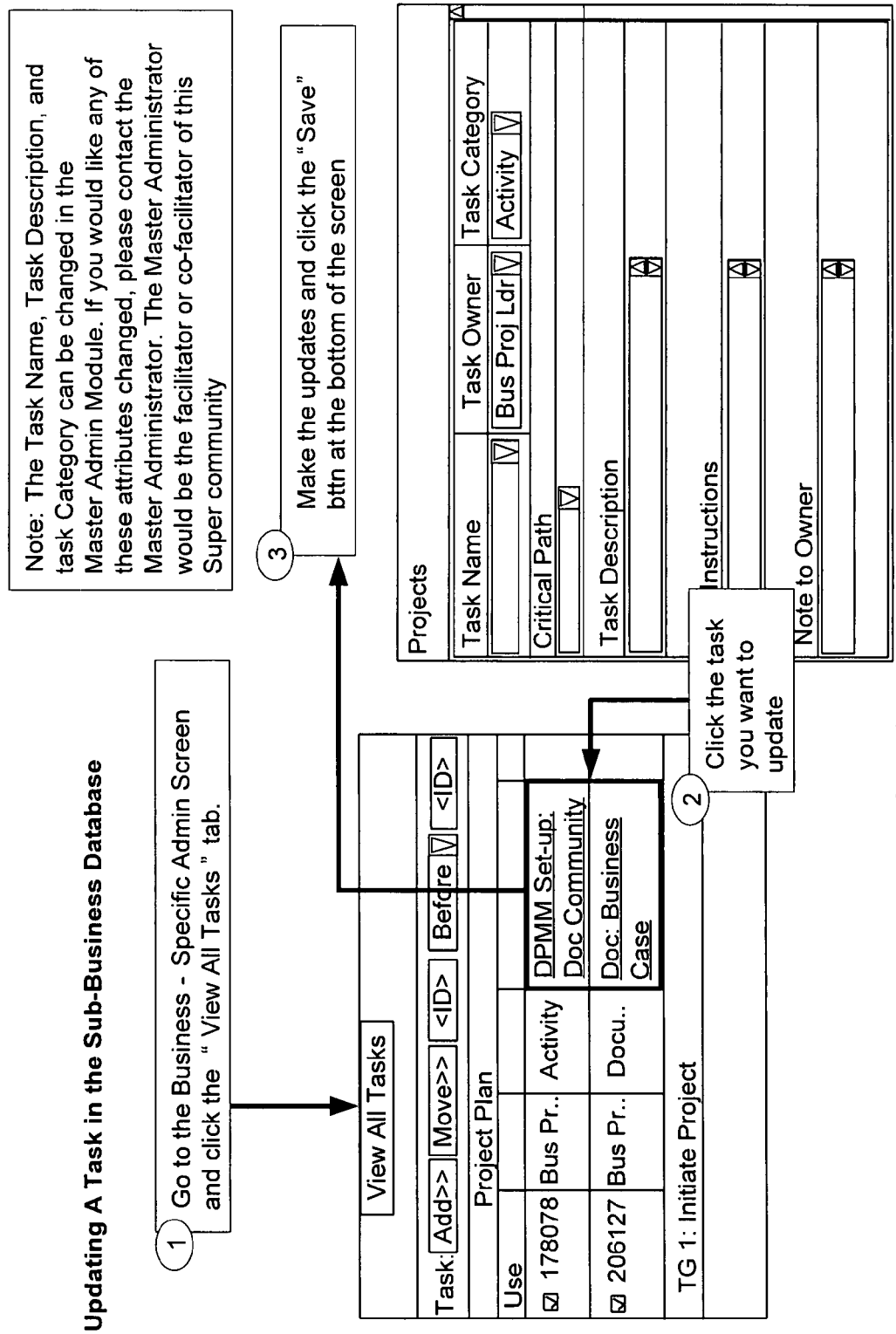
FIG. 21 shows an exemplary user interface that may be generated by using the method illustrated in FIG. 3.

The first user customizes the task within the additional database by making desired modifications to the task after server system 12 populates the additional database with the task. As illustrated in FIG. 21, the first user customizes the task without changing a source code for customizing the task by accessing the additional database, selecting a tab, such as "View All Tasks", within the project, selecting the task, such as 'DPMM Set-up: Doc Community . . . " the first user desires to customize, making changes to information, such as "Task Instructions", associated with the task, and saving the changes.

The second user customizes the task within the first database by accessing the first database, accessing a task list including the task, selecting the task from the task list, and making changes to information associated with the task. When the second user makes changes made to the task within the first database, server system 12 automatically makes the changes to the task within the additional database.

Figure 22:
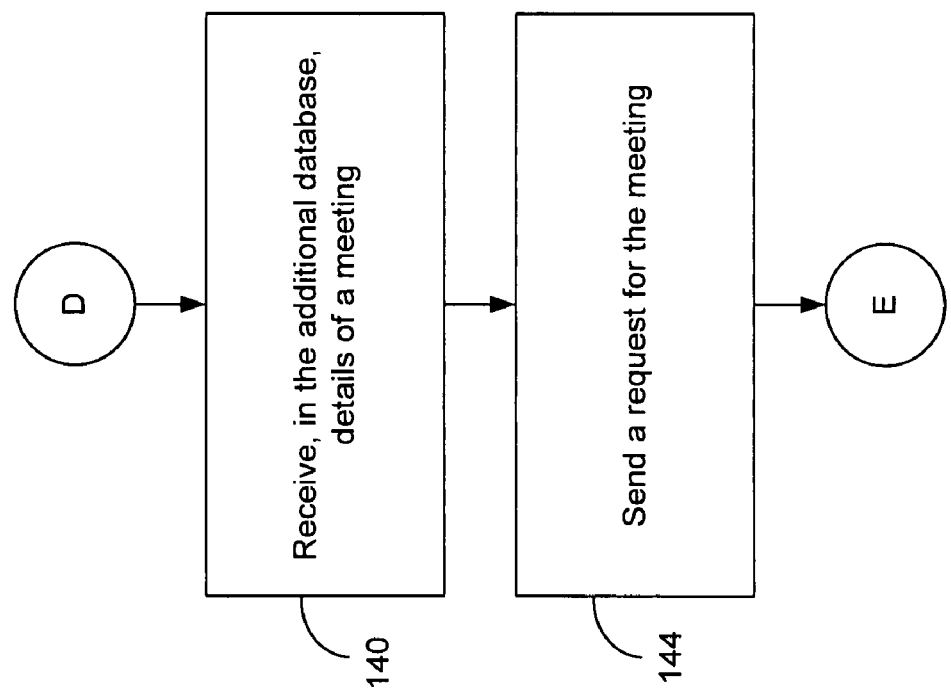
FIG. 22 is a flowchart of the method for managing information.
Figure 23:
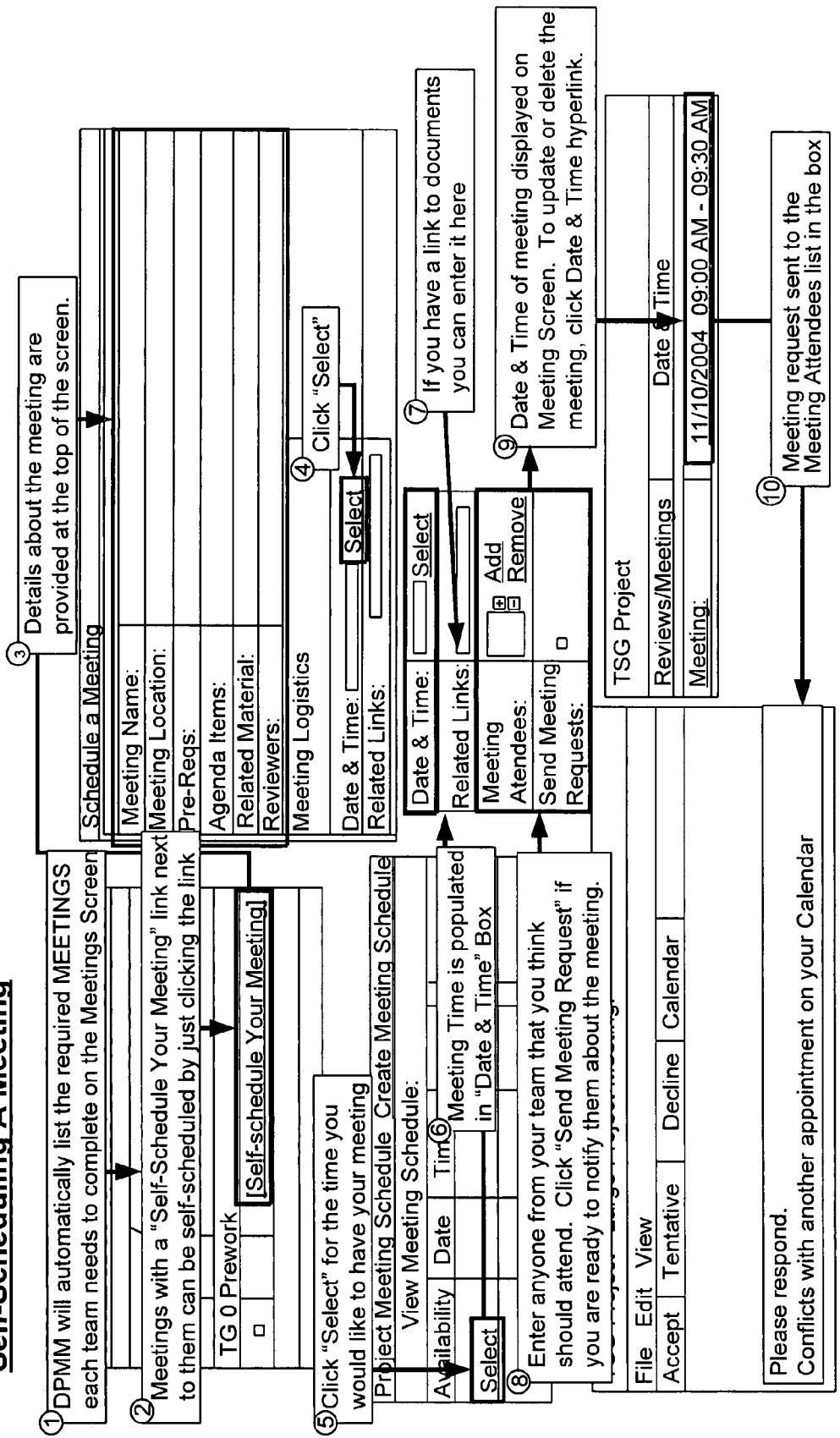
FIG. 23 shows an exemplary user interface that may be generated by using the method illustrated in FIG. 3.
Figure 25:
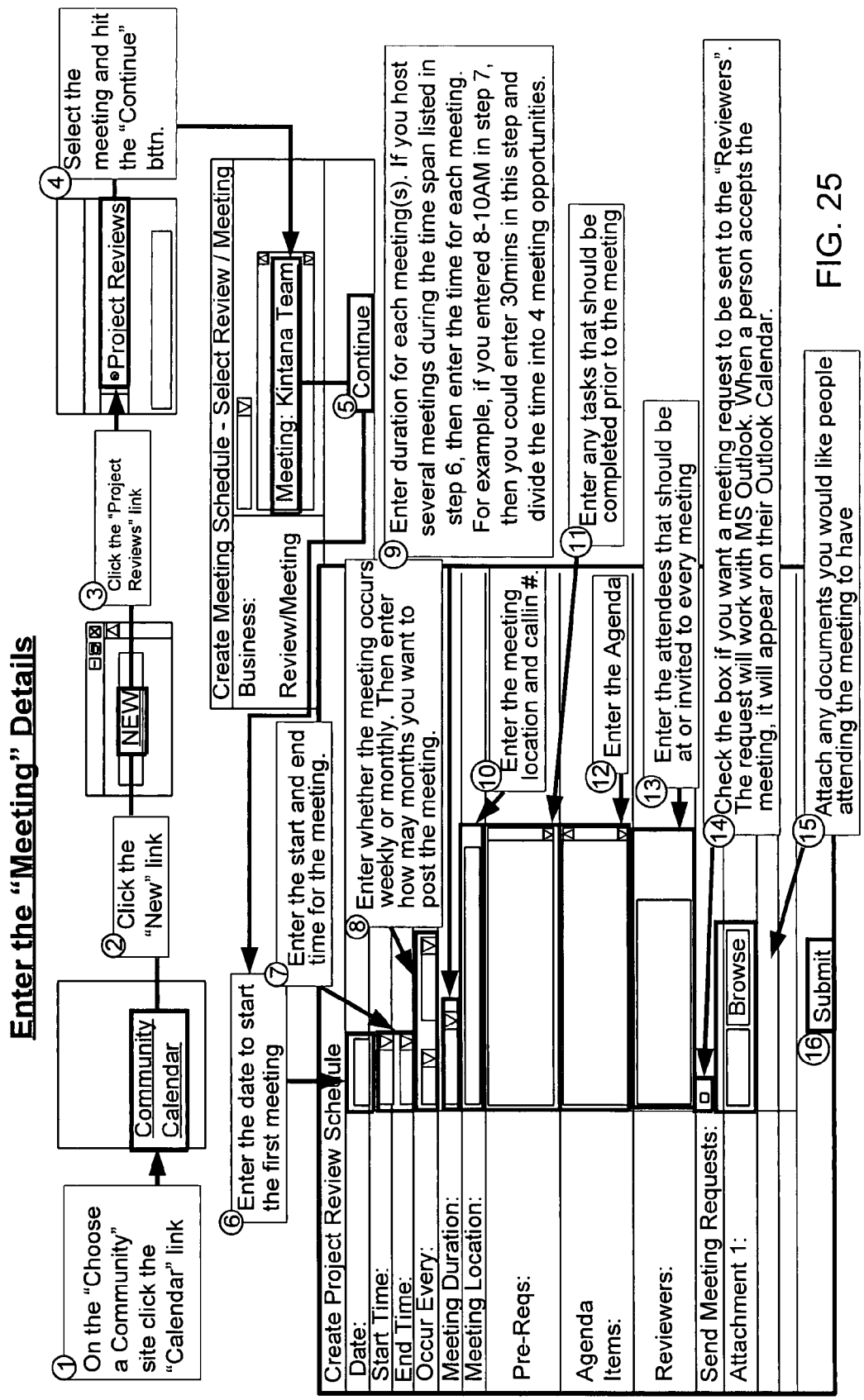
FIG. 25 shows an exemplary user interface that may be generated by using the method illustrated in FIG. 3.

FIG. 22 is a flowchart of method 18 and FIGS. 23-25 illustrate user interfaces generated by executing method 18. When server system 12 populates the additional database with the task, the additional database automatically receives 140 details, such as a name, a location, and a time period, of the meeting. As illustrated in FIG. 23, when the first user accesses the task within the additional database and if the task is categorized as the meeting, server system 12 generates a self-schedule link, such as "Self-Schedule Your Meeting" besides the task. When the first user selects the self-schedule link, server system 12 provides the details, such as "Meeting Name" and "Meeting Location", about the meeting to the first user. When the first user selects the self-schedule link, server system 12 generates a select button. When the first user selects the select button, server system 12 generates a list including the time period, such as "09:00 AM-09:30 AM", scheduled for the meeting. When the first user selects the time period, server system 12 creates a send request field, such as "Send Meeting Requests", a list of meeting attendees, and a box including a field, such as "Related Links", for attaching a link to documents to be used to prepare for the meeting. When the first user selects the time period, the list of meeting attendees includes a plurality of meeting attendees that are selected by the first user authorized by the business to migrate the plurality of tasks into the first database. In an alternative embodiment, the first user adds additional meeting attendees. In yet another alternative embodiment, the first user removes the meeting attendees. In an alternative embodiment, the first user changes the time period of the meeting. When the first user selects the send request field, server system 12 sends 144 a request for attending the meeting to the meeting attendees within the list of meeting attendees. In an alternative embodiment, the request for the meeting is received by a meeting manager software, such as Microsoft® Outlook, different than the computer program implementing method 18. For example, a calendar in Microsoft® Outlook receives the request for the meeting when the first user selects the send request field.

As illustrated in FIG. 24, the second user categorizes the task as the meeting by accessing the task within the first database and selecting 'Meeting' as the category of the task. As illustrated in FIG. 25, when the second user accesses the task within the first database, the second user selects the community and is routed to a calendar link, such as "Community Calender", managed by the community. When the second user is routed to the calendar link and the second user selects the calendar link, server system 12 generates a meeting box, such as a box with title "SupportCentral: Create Project Review Schedule—Microsoft Internet Explorer". The second user enters, within the meeting box, the details, such as 'Date', "Start Time", "End Time", and frequency of the meeting. The second user also enters, within the meeting box, the details, such as pre-requisites for the meeting, the location of the meeting, a call-in number of the meeting, the time period of the meeting, the meeting attendees, such as 'Reviewers', of the meeting, and attachments that the first user intends the meeting attendees to have before attending the meeting. The first user selects the send request field within the meeting box if the first user desires to send the request for the meeting to the meeting attendees. When the first user selects a submit button within the meeting box, server system 12 saves the details of the meeting and sends the request for the meeting to the meeting attendees.

Figure 26:
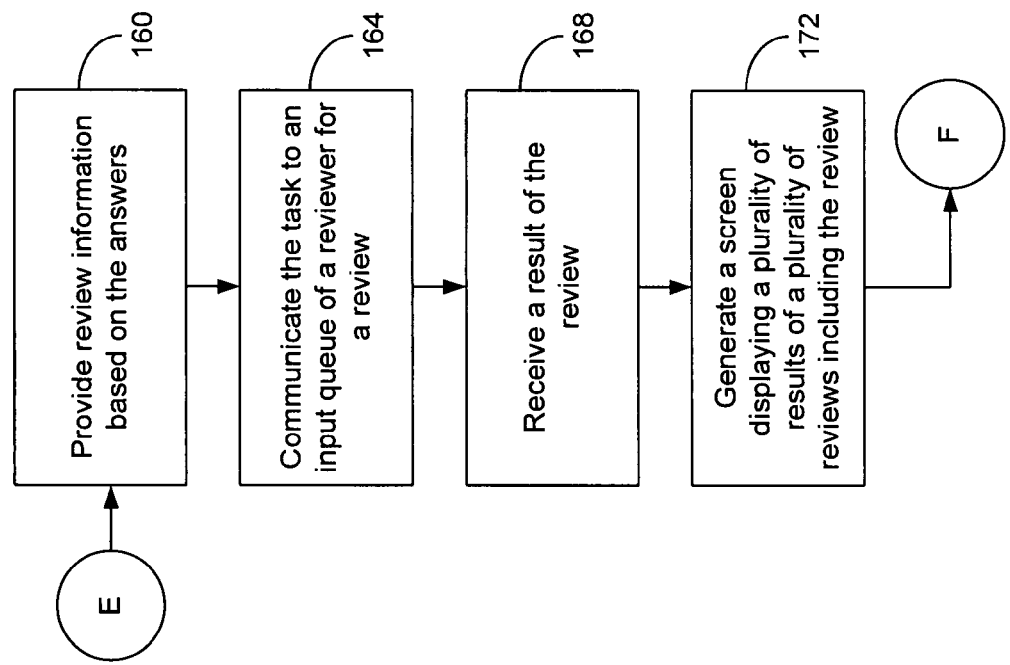
FIG. 26 is a flowchart of the method for managing information.
Figure 27:
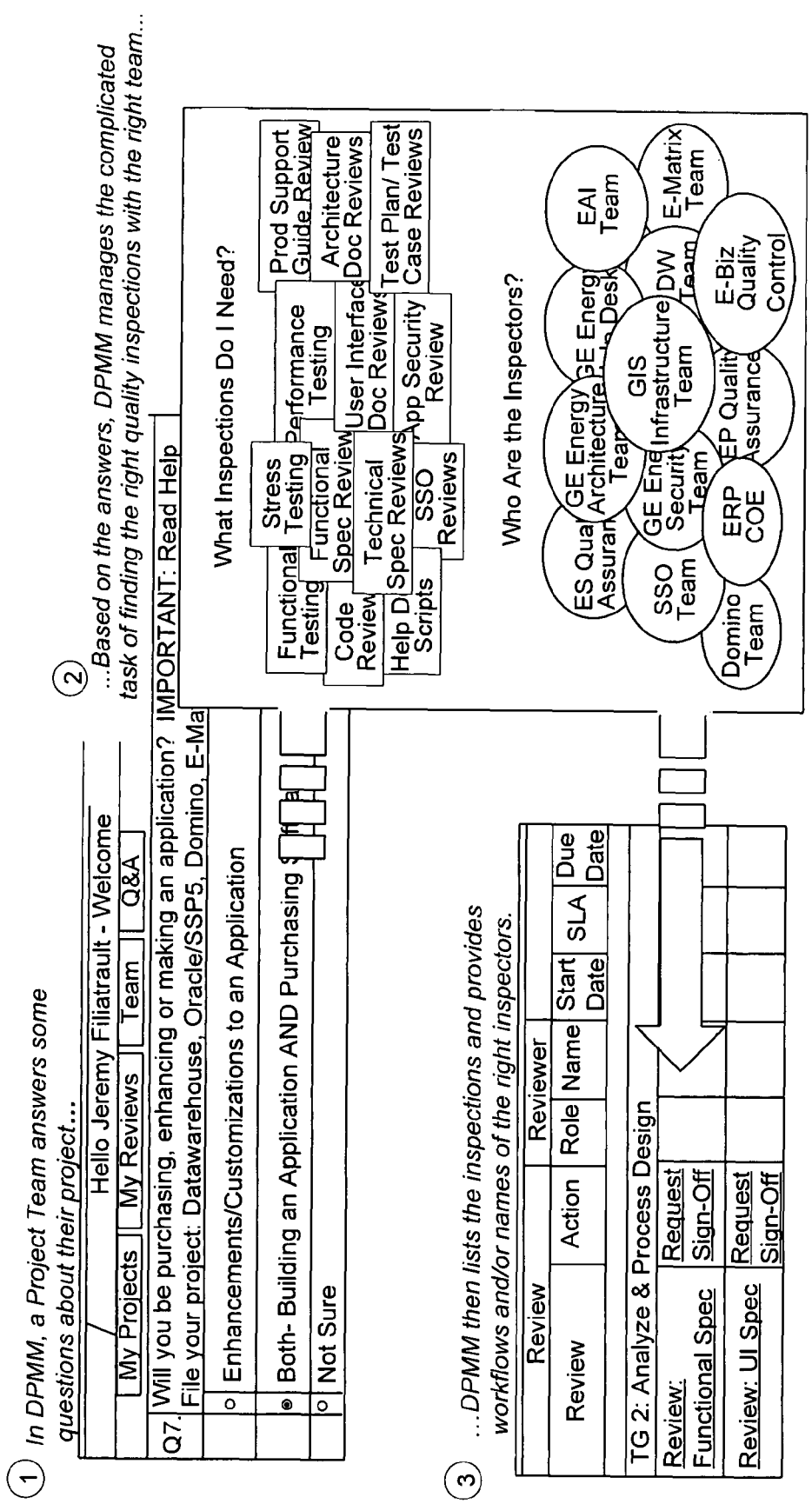
FIG. 27 shows an exemplary user interface that may be generated by using the method illustrated in FIG. 3.

FIG. 26 is a flowchart of method 18 and FIGS. 27-35 illustrate user interfaces generated by executing method 18. As illustrated in FIG. 27, server system 12 automatically provides 160 to the first user review information including a reviewer of the task, such as "Review: Functional Spec", based on the answers to the questions. The reviewer has a role, such as an 'Architect', and/or a name.

Figure 28:
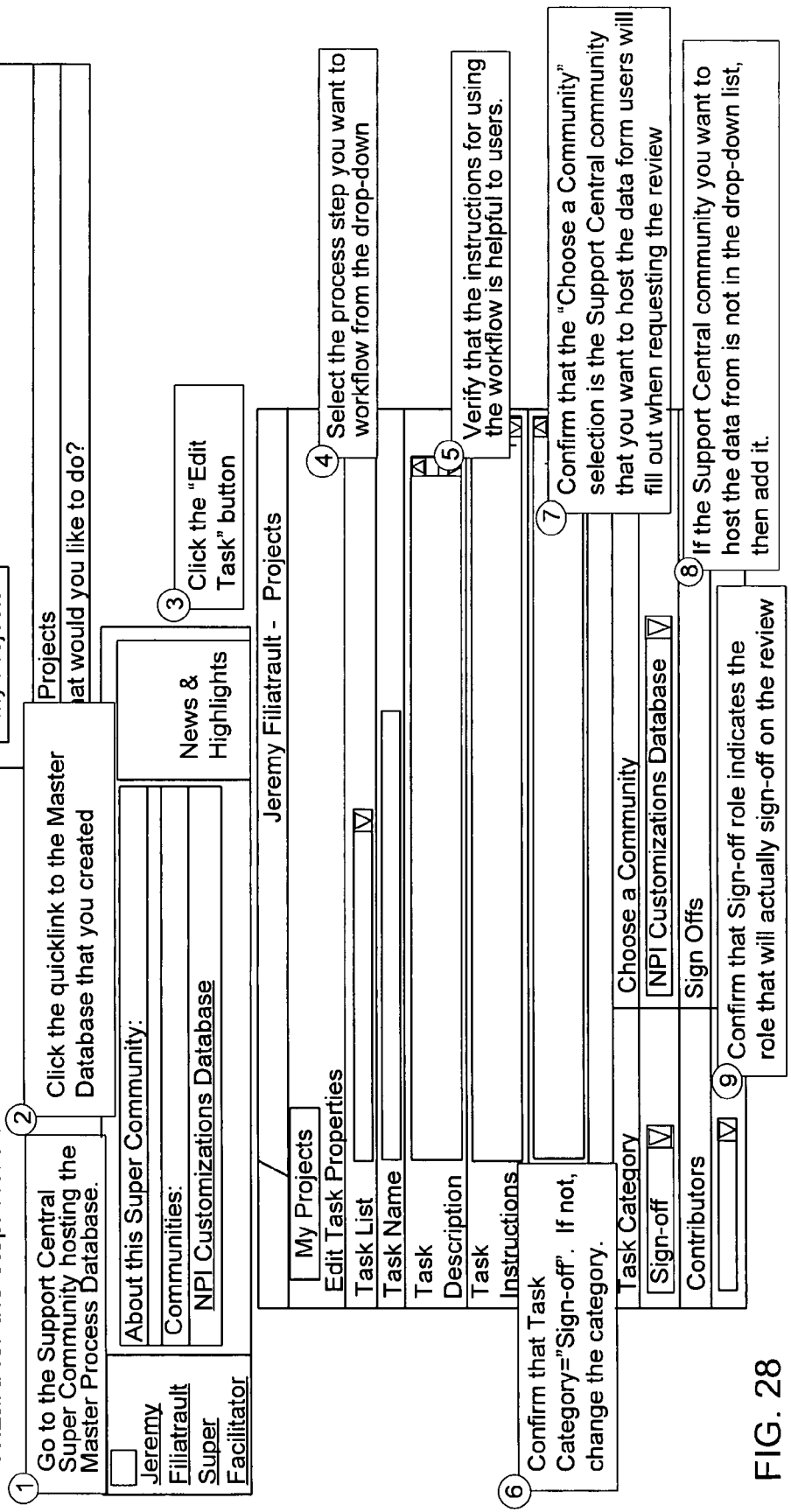
FIG. 28 shows an exemplary user interface that may be generated by using the method.

The task that is designated for a review by the reviewer is categorized as sign-off by the second user. As illustrated in FIG. 28, the second user categorizes the task as sign-off by accessing the first database, accessing the task within the first database, and selecting the category of the task as 'sign-off'.

The second user also selects the community, such as "NPI Customizations Database", which hosts an inspection form when submitting a request for the review. The second user further selects the role, such as "TSG Arch Team", of the reviewer. If the community that the first user intends to host the inspection form is not available, the first user creates the community by creating 70 the additional database.

Figure 29:
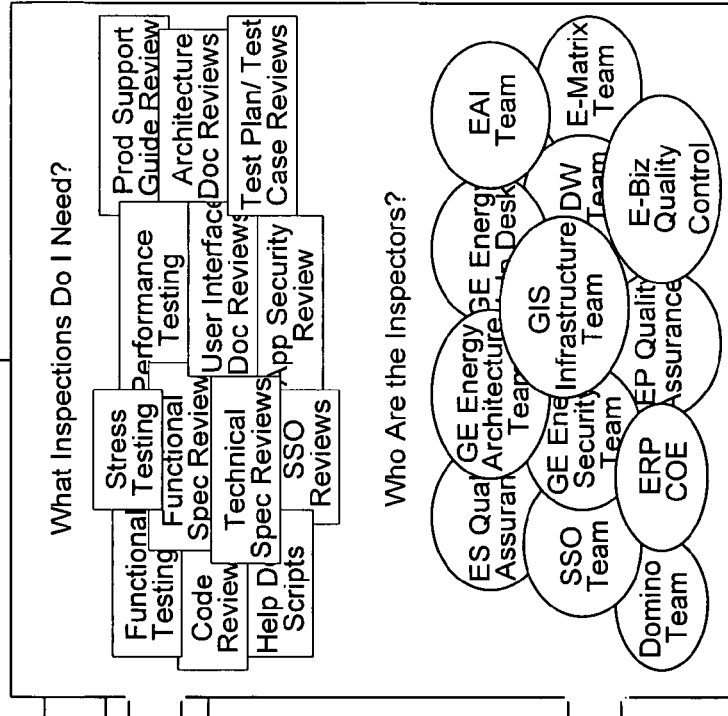
FIG. 29 shows an exemplary user interface that may be generated by using the method illustrated in FIG. 3.

When the second user selects a link, such as "Request Sign-off", from the review information, server system 12 generates the inspection form. As illustrated in FIG. 29, the second user creates the inspection form by accessing the community that the second user intends to host the inspection form, by selecting a link, such as "Manage Data Forms", and by selecting another link, such as "Create New Data Form", to generate a manage data forms box. As illustrated in FIGS. 29 and 30, the second user creates, within the manage data forms box, fields for entering information, such as a name of the inspection form, contact information of the first user requesting the review, an author of a document describing the task and/or the project, a major version number of the task and/or the project, and a minor version number of the task and/or the project.

Figure 31:
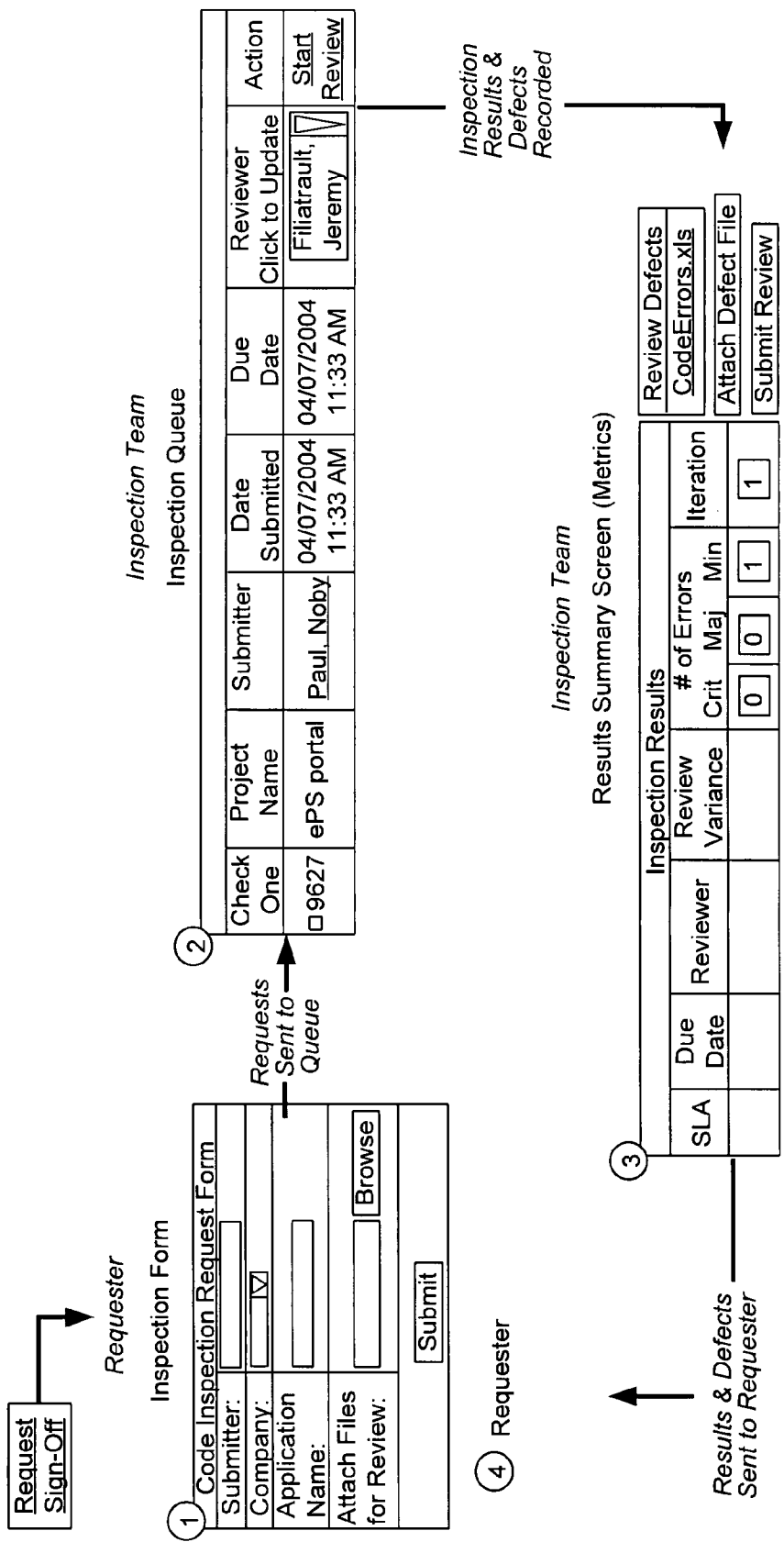
FIG. 31 shows an exemplary user interface that may be generated by using the method illustrated in FIG. 3.

As illustrated in FIG. 31, the first user enters, within the manage data forms box, information, such as a name of the first user requesting the review, a company that authorizes the first user to submit the review, a name of the task or alternatively of the project, and files for the review. When the first user submits a request for the review by selecting a submit button on the inspection form, server system 12 communicates 164 the task or alternatively the project in an input queue, such as an "Inspection Queue", of the reviewer. The input queue is specific to the reviewer and cannot be accessed by another reviewer who can access another input queue. Once the reviewer completes the review, the first user receives 168 a result, including "# of errors" and defects, of the review, from the reviewer.

The result of the review is stored in computer-readable medium 22. A plurality of reviewers including the reviewer store results, such as "total work time", of a plurality of reviews including the review in computer-readable medium 22. The results include the result of the review. In an alternative embodiment, as illustrated in FIG. 32, the plurality of reviews are of the plurality of tasks and/or a plurality of projects developed by the sub-businesses, such as "GE Energy Products" and "GE Energy Shared Services", of the business, such as "GE Energy". In another alternative embodiment, the plurality of reviews are of the plurality of tasks and/or a plurality of projects developed by a plurality of teams, such as "GEE Arch Team" and "GEE QC Team", of the business, such as "GE Energy". In yet another alternative embodiment, the plurality of reviews are of the plurality of tasks and/or a plurality of projects developed by vendors, such as "Oracle Corporation" and "Birlasoft", providing services and/or products to the business, such as "GE Energy". Each of the plurality of reviewers use the same standards for reviewing the plurality of tasks and/or the projects. In an alternative embodiment, each of the plurality of reviewers use a different standard than standards of remaining of the plurality of reviewers.

Server system 12 generates 172 a single screen that displays the results of the plurality of reviews. For example, when the first user selects a button to display the results categorized based on the vendors, server system 12 displays the results on a screen titled "Vendor Performance". As another example, when the first user selects a button to display the results categorized based on the plurality of sub-businesses, server system 12 displays the results on a screen titled "Business Performance". As yet another example, when the first user selects a button to display the results categorized based on the plurality of teams, server system 12 displays the results on a screen titled "IT Team Performance".

Other examples of the results of the reviews include "TOT Work Time (Hrs)", "Passed First Reviews", "Failed First Reviews", "First Time Right %", "Cycle Time Rework (Bus Days)" spent by "Project Team", "Cycle Time Rework (Bus Days)" spent by "Review Team", "Labor Time Rework (Hrs)" spent by "Project Team" and "Review Team", and "TOT Labor Hrs". The "Project Team" includes people who worked on the project. The "Review Team; includes the plurality of reviewers. The "TOT Work Time (Hrs)" is a total amount of time spent on developing the task and/or the project before a first review of the task and/or the project. The "Passed First Reviews" is a total number of the plurality of reviews for items, such as a functional specification and user interface specification, which passed on a first attempt. For example, if the functional specification of the task passed the review on the first attempt, and the user interface specification of the task passed the review on the first attempt, the "Passed First Reviews" is two. The "Failed First Reviews" is a total number of the plurality of reviews for the items which failed on the first attempt. "First Time Right %" is a percentage of the "Passed First Reviews" from a sum of "Passed First Reviews" and "Failed First Reviews".

The "Cycle Time Rework (Bus Days)" is a number of business days spent on the task and/or the project to rectify the task and/or project after the first attempt. Server system 12 calculates the "Cycle Time Rework (Bus Days)" spent by the "Project Team" by counting an amount of business days from a date on which the task and/or project fails on the first attempt until a date on which the "Project Team" takes finishes rectifying the project and/or the task. The "Review Team" provides the date on which the task and/or project fails on the first attempt to server system 12 and the "Project Team" provides the date on which the "Project Team" finishes rectifying the project and/or the task to server system 12. In an alternative embodiment server system 12 calculates the "Cycle Time Rework (Bus Days)" spent by the "Project Team" after a second attempt of the review by counting an amount of business days from a date on which the "Review Team" finishes the second attempt to a date on which the "Project Team" finishes re-rectifying the task and/or the project after the second attempt. "Review Team" provides the date on which the "Review Team" finishes the second attempt to server system 12 and "Project Team" provides the date on which the "Project Team" finishes re-rectifying the task and/or the project after the second attempt to server system 12.

Server system 12 calculates the "Cycle Time Rework (Bus Days)" spent by the "Review Team" by counting an amount of business days from a date on which the "Project Team" finishes rectifying the task and/or project to a date on which the "Review Team" finishes reviewing the project and/or the task after the rectification. The "Review Team" provides the date on which the "Review Team" finishes reviewing the project and/or the task after the rectification.

The "Labor Time Rework (Hrs)" is a number of hours spent on the task and/or the project to rectify the task and/or project after the first attempt. The "Project Team" enters, on a form, the "Labor Time Rework (Hrs)" spent by the "Project Team" to rectify the task and/or the project after the first attempt. The "Review Team" enter, on a form, the "Labor Time Rework (Hrs)" spent by the "Review Team" to review the task and/or the project after the "Project Team" rectifies the task and/or the project.

Server system 12 does not calculate the "Cycle Time Rework (Bus Days)" if task and/or project has passed on the first attempt. Server system 12 calculates the "Cycle Time Rework (Bus Days)" if the task and/or project have failed on the first attempt. In an alternative embodiment, server system 12 calculates the "Cycle Time Rework (Bus Days)" if the task and/or project have failed on the second attempt.

The "Project Team" provides the major and minor versions of the task and/or the project to server system 12. Examples of the major version include 1.0, 2.0. and 3.0. Examples of the minor version include 0.1, 0.2, and 0.3. If the task and/or the project failed the review on an attempt, such as the first attempt or alternatively the second attempt, and if the "Project Team" determines that the task and/or the project will take at least a set amount of time, such as two weeks, for rectifying the task and/or the project, there is an increment in the major version of the task and/or the project.

If the task and/or the project failed the review on the attempt and if the "Project Team" determines that the task and/or the project will take less than the set amount of time for rectifying the task and/or the project, there is an increment in the minor version of the task and/or the project. Server system 12 resets the minor version at a time at which the major version changes. Server system 12 increments a number of the attempt of the review when server system 12 detects an increment in the major version or alternatively the minor version. If the task and/or the project passes on the attempt, server system 12 freezes the number of the attempt. If the "Project Team" and/or the "Review Team" determines to cancel the review, the number of the attempt stays the same as before the review.

Server system 12 keeps a check on the major version and the minor version. For example, if server system 12 determines that the "Project Team" has provided 1.0 as the major version that precedes 2.3 as the major version, server system 12 searches for one change to the major version and three changes to the minor version.

Server system 12 calculates a sigma value, which is a probability of occurrence of defects in characteristics of the task and/or project. The "Review Team" detects the defects from the review. The "Review Team" provides the characteristics to server system 12. Server system 12 multiplies a number of the characteristics with a number of portions, such as code lines, of the task and/or the project to compute a first number. The "Review Team" distributes the defects into groups, such as critical, major, and minor defects, and provides a weight for each of the groups of the defects to server system 12. Server system 12 multiplies the weight with a corresponding one of the groups of the defects to generate a weighted defect for each of the groups. For example, server system 12 multiplies a number of the critical defects with a weight three. Server system 12 adds a plurality of weighted defects including the weighted defect for the groups to calculate a second number. Server system 12 divides the second number by the first number to generate the sigma value.

Figure 33:
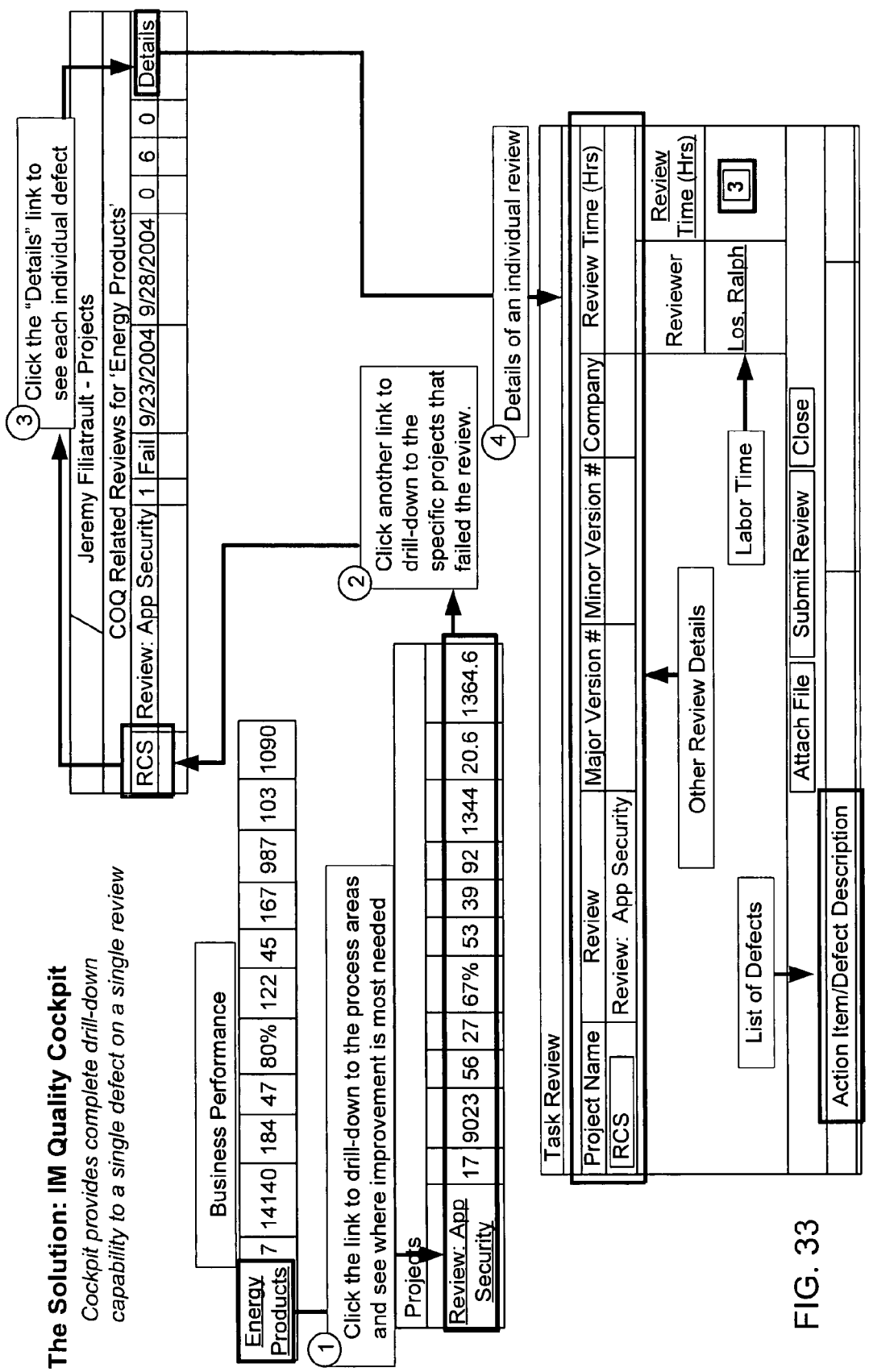
FIG. 33 shows an exemplary user interface that may be generated by using the method illustrated in FIG. 3.

Server system 12 filters the results of the reviews to categorize the results according to a plurality of areas of the reviews and to generate a first subset of the results. For example, as illustrated in FIG. 33, when the first user selects a link representing the sub-business, such as "GE Energy Products", server system 12 categorizes the results based on the areas, such as "Review: App Security", of the reviews of the plurality of tasks and/or a plurality of projects developed by the sub-business.

Server system 12 filters the first subset to categorize the first subset according to the plurality of projects and/or the plurality of tasks and to generate a second subset. For example, when the first user selects a link, such as 'Review: App Security", from the plurality of areas, server system 12 generates a list of the plurality of tasks and/or the plurality of projects, such as 'RCS', developed by the sub-business.

Server system 12 filters the second subset to generate a detailed view of the review. For example, when the first user selects a link, such as 'RCS', server system 12 generates the detailed view that includes the result, such as a number of the major version, a number of the minor version, a number of the critical defects, a number of the major defects, and a number of the minor defects, of the review.

As illustrated in FIG. 34, the second user provides the review information to server system 12 by accessing the additional database, selecting the task that is categorized as a sign-off within the additional database, selecting the "Review Team", selecting a "Primary Reviewer" and a "Secondary Reviewer" of the "Review Team", selecting a form to be used by the "Review Team" for performing the review, and by selecting whether the review is to be initiated from a screen displayed when method 18 is executed or alternatively from a screen displayed by executing a method other than method 18. If the review is to be initiated from the screen displayed by executing the method other than method 18, the second user provides a hyperlink to the screen. The hyperlink is displayed to the first user requesting the review. As illustrated in FIG. 35, the second user provides the review information to server system 12 by accessing the additional database, selecting the task that is categorized as a sign-off within the additional database, selecting a review form that is provided to the first user for filling information required by the "Review Team" when the first user provides the plurality of answers, selecting an acceptable number of attempts including the attempt in passing the review, selecting some of the plurality of tasks to be completed by the first user before the review. The second user provides the review information to server system 12 by accessing the additional database, selecting the task that is categorized as a sign-off within the additional database, selecting whether server system 12 automatically provides the "Project Team" with the attempt if the task and/or the project fails the review, and selecting a submit button.

Figure 36:
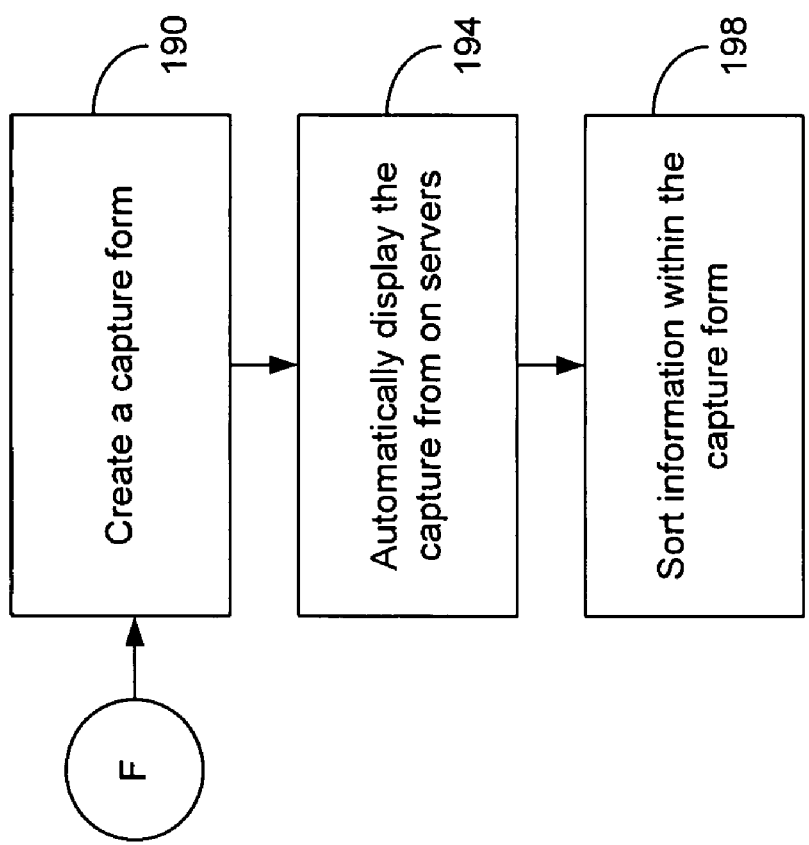
FIG. 36 is a flowchart of the method for managing information.
Figure 37:
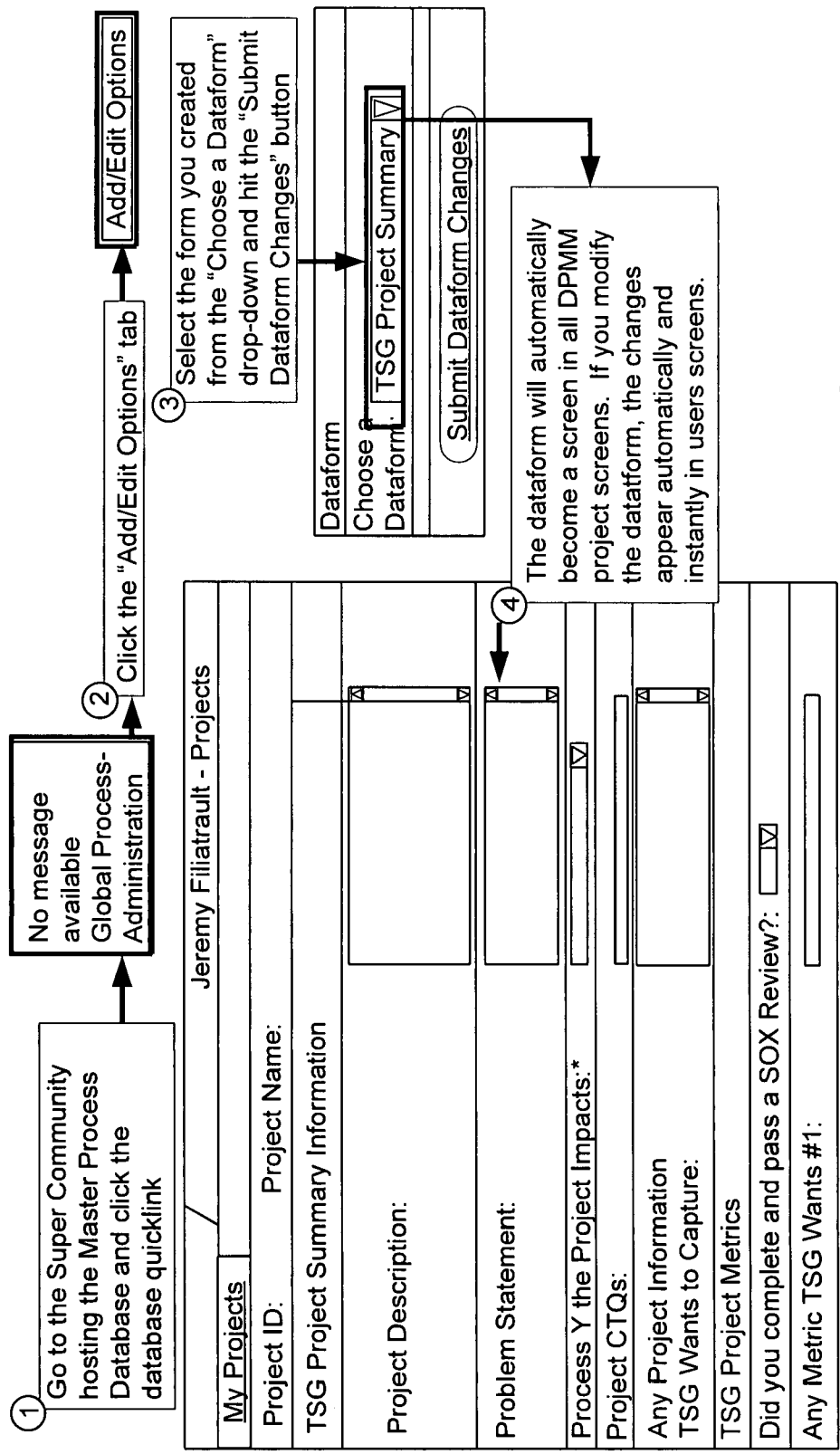
FIG. 37 shows an exemplary user interface that may be generated by using the method illustrated in FIG. 3.

FIG. 36 is a flowchart of method 18 and FIGS. 37-38 illustrate user interfaces generated by executing method 18. The first user creates 190 a capture form that includes fields to capture data regarding the plurality of projects. The capture form is created by creating any number of fields to include any amount of information within the manage data forms box. The first user creates 190 the capture form in a manner similar to that in which the inspection form is created. The first user creates 190 the capture form without making a change to a source code for creating the capture form because the capture form is created by accessing the community that the first user intends to host the capture form, by selecting a link, such as "Manage Data Forms", by selecting another link, such as "Create New Data Form" to generate the manage data forms box, and by creating fields by entering information, such as "Project Description" and "Problem Statement", within the manage data forms box.

As illustrated in FIG. 37, the first user accesses the capture form by accessing the additional database, selecting a tab, such as "Add/Edit Options tab", choosing the capture form, such as "TSG Project Summary". When the first user chooses the capture form within the additional database, server system 12 automatically displays 194 the capture form as a screen on a plurality of servers operated by a plurality of users including the first user. If the first user accesses the capture form and modifies the capture form, server system 12 automatically modifies the capture form displayed on the plurality of servers.

The plurality of users receive the capture form, enter information within the fields within the capture form, and communicate the capture form to server system 12. Server system 12 captures information provided by the plurality of users when server system 12 receives the capture form from the plurality of users.

As illustrated in FIG. 38, server system 12 receives the capture form from the plurality of users and sorts 198 information within the capture form to generate a summary report, such as a "Project Summary Report". Server system 12 sorts 198 information within the capture form when the second user selects a run button, such as a "Run Report" button. Information within the capture form is sorted without making a change to a source code for capturing the information because the information is sorted when the first user selects the run button. The first user accesses the additional database and selects whether criteria, such as "Project Name" and "Last Date Updated", is visible within the summary report. In an alternative embodiment, the first user accesses the additional database and selects whether the summary report displays the criteria and whether the capture form is sorted based on the criteria.

In an alternative embodiment, server system 12 is coupled to client system 14 via WAN 37. The second user operates server system 12 to communicate with the first user operating client system 14. In another alternative embodiment, server system 12 is coupled to the plurality of servers via a WAN and/or a LAN. The business operates server system 12 and a plurality of sub-businesses including the sub-business operate the plurality of servers. In yet another alternative embodiment, the second user operates server system 12 and the plurality of users operate the plurality of servers.

Technical effects of the systems and methods for managing information include executing method 18 without changing a source code. Method 18 is user-friendly and does not require the first or alternatively the second user to learn a programming language for changing a source code. The first or alternatively the second user executes method 18 without changing a source code for executing method 18. Additional technical effects of the systems and methods include associating the plurality of questions and answers with the task. Further technical effects of the systems and methods include automatically communicating the additional task to the additional database when the second user adds the additional task into the first database. Additional technical effects of the systems and methods include creating 190 the capture form without making a change to a source code for creating the capture form. Technical effects of the systems and methods include sorting 198 information within the capture form without making a change to a source code for sorting the information.

While the invention has been described in terms of various specific embodiments, those skilled in the art will recognize that the invention can be practiced with modification within the spirit and scope of the claims.

What is claimed is:

1. A method for managing information comprising:
    generating a first database in a first memory device;
    storing, by an administrator via a server system, a plurality of predefined questions in the first database, wherein the plurality of predefined questions relate to project information and include at least a first predefined question and a second predefined question;
    storing, by the administrator, a plurality of predefined answer options related to the project information, wherein each predefined answer option corresponds to one of the plurality of predefined questions;
    associating, by the administrator, each of the plurality of predefined answer options with a task by pre-defining, within the first database, a task to be performed based on each of the plurality of predefined answer options;
    associating, by the administrator, a plurality of tools used to complete a task with each task, wherein said plurality of tools includes at least one expert on a task;
    providing, via a computer, to a user, the plurality of predefined questions and the plurality of predefined answer options;
    receiving a plurality of answers from the user, wherein the plurality of answers are chosen by the user from the provided plurality of predefined answer options, and wherein at least one answer option associated with the second predefined question is modified based on an answer from the first predefined question from the user, wherein modifying at least one answer option comprises at least one of adding at least one answer option associated with the second predefined question and removing at least one answer option associated with the second predefined question;
    determining, by the computer, a task and tools based on the plurality of answers provided by the user;
    creating at least one additional database in a second memory device based on the plurality of predefined answer options;
    associating the first database with the at least one additional database based on the plurality of answers provided by the user without making a change to at least one source code;
    populating the at least one additional database with the determined task; and
    prompting the user to customize the determined task within the at least one additional database, without changing the at least one source code, after the at least one additional database has been populated.

2. The method in accordance with claim 1 wherein at least one of said generating and said creating is performed without making a change to at least one source code.

3. The method in accordance with claim 1 wherein at least one of said generating, creating, and associating the first database with the at least one additional database are performed without making a change to at least one source code.

4. The method in accordance with claim 1 further comprising:
    migrating a plurality of tasks comprising the determined task into the first database; and
    populating the at least one additional database by downloading the plurality of tasks from the first database into the at least one additional database, wherein said populating is performed without additional input from any users and when the plurality of tasks are migrated into the first database.

5. The method in accordance with claim 1 further comprising:
    migrating a plurality of tasks comprising the determined task into the first database;
    populating the at least one additional database by downloading the plurality of tasks from the first database into the at least one additional database, wherein said populating is performed when the plurality of tasks are migrated into the first database;

adding an additional task into the first database; and
communicating the additional task to the at least one additional database without additional input from any users and when the additional task is added to the first database.

6. The method in accordance with claim 1 further comprising:
migrating a plurality of tasks comprising the determined task into the first database;
populating the at least one additional database by downloading the plurality of tasks from the first database into the at least one additional database, wherein said populating is performed when the plurality of tasks are migrated into the first database;
adding an additional task into the first database; and
prompting the user whether to export the additional task to a project database comprising the plurality of tasks.

7. The method in accordance with claim 1 wherein the determined task comprises a meeting, said method further comprises:
receiving details including at least one of a time period and a location of the meeting; and
receiving a request for the meeting in a meeting manager software different than a computer program executing the method.

8. The method in accordance with claim 7 wherein the project information includes at least one of information regarding managing risks, building real estate, buying real estate, selling real estate, developing a web site, selling insurance, drafting a patent application, and writing a software.

9. A system for managing information, said system comprising:
a server configured to:
provide, to a first user, a predefined plurality of questions including at least a first predefined question and a second predefined question and a predefined plurality of answer options;
receive a plurality of answers from the first user including an answer to the first predefined question, wherein at least the second predefined question in the predefined plurality of questions provided to the user is modified based on the answer from the first predefined question chosen by the user, wherein modifying at least the second predefined question comprises at least one of adding at least one answer option associated with the at least second predefined question and removing at least one answer option associated with the at least second predefined question;
generate a first database based on the predefined plurality of questions;
pre-define, within the first database, a task to be performed based on each of the plurality of predefined answer options;
associate, by an administrator via a server system, at least one of the plurality of redefined answer options with the task;
determine the task to be performed based on the plurality of answers provided by the first user;
receive an association of the task with a plurality of tools, wherein the plurality of tools includes at least one expert on the task;
create at least one additional database based on the predefined plurality of answer options, wherein said server performs at least one of generating the first database and creating the at least one additional database without making a change to at least one source code;
associate, the first database with the at least one additional database based on the plurality of answers;
populate the at least one additional database with the task; and
prompt the first user to customize the task within the at least one additional database, without a change to a source code, after the at least one additional database has been populated.

10. The system in accordance with claim 9 wherein said server further configured to receive an association, from a second user, of the answers with the task.

11. The system in accordance with claim 9 wherein said server performs at least one of the generation, creation, and association without making a change to at least one source code.

12. The system in accordance with claim 9 wherein said server further configured to:
migrate a plurality of tasks comprising the task into the first database; and
populate the at least one additional database by downloading the plurality of tasks from the first database into the at least one additional database, wherein said server populates the at least one additional database without additional input from any users and when the plurality of tasks are migrated into the first database.

13. The system in accordance with claim 9 wherein said server further configured to:
migrate a plurality of tasks comprising the task into the first database;
populate the at least one additional database by downloading the plurality of tasks from the first database into the at least one additional database, wherein said server populates the at least one additional database when the plurality of tasks are migrated into the first database;
identify an additional task into the first database; and
communicate the additional task to the at least one additional database without additional input from any users and when the additional task is added to the first database.

14. The system in accordance with claim 9 wherein said server further configured to:
migrate a plurality of tasks comprising the task into the first database;
populate the at least one additional database by downloading the plurality of tasks from the first database into the at least one additional database, wherein said server populates the at least one additional database when the plurality of tasks are migrated into the first database;
identify an additional task into the first database; and
prompt the first user whether to export the additional task to a project database comprising the plurality of tasks.

15. The system in accordance with claim 9 wherein the task comprises a meeting, said server further configured to receiving details including at least one of a time period and a location of the meeting.

16. A method for managing information, said method comprising:
creating a form comprising data fields;
displaying the form automatically on a plurality of computer screens used by a plurality of users, wherein the form comprises:
a first question;
a plurality of answer options associated with the first question;
at least one second question; and
a plurality of answer options associated with the at least one second question;

generating a first database based on the first question and based on the at least one second question;

capturing data within the data fields from the plurality of users, wherein data captured from a first user of the plurality of users comprises at least one answer from the plurality of answer options associated with the first question;

modifying at least one answer option of the plurality of answer options associated with the at least one second question based on the at least one answer associated with the first question, wherein modifying at least one answer option comprises at least one of adding at least one answer option associated with the at least one second question and removing at least one answer option associated with the at least one second question;

automatically displaying the captured data and the at least one modified answer option in the data fields of the form displayed to the plurality of users;

updating the captured data from the first user based on an answer from the plurality of answer options associated with the at least one second question;

determining a task to be performed based on the updated captured data;

sorting the updated captured data, wherein at least one of said creating and said sorting is performed without changing at least one source code;

generating at least one additional database based on the plurality of answer options associated with the first question and the at least one second question;

associating the first database with the at least one additional database based on the updated captured data; and populating the at least one additional database with the task.

* * * * *